United States Patent
Fujii

(10) Patent No.: US 7,386,058 B2
(45) Date of Patent: Jun. 10, 2008

(54) TRANSCEIVER APPARATUS AND TRANSCEIVING METHOD

(75) Inventor: Masaaki Fujii, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 11/049,381

(22) Filed: Feb. 2, 2005

(65) Prior Publication Data
US 2005/0163238 A1 Jul. 28, 2005

Related U.S. Application Data

(63) Continuation of application No. PCT/JP02/08636, filed on Aug. 28, 2002.

(51) Int. Cl.
*H04L 1/02* (2006.01)
(52) U.S. Cl. .............. 375/267; 375/140; 375/146; 455/101; 370/203; 370/464; 370/465
(58) Field of Classification Search ........... 375/140, 375/141, 146, 147, 260, 267; 370/203, 319–321, 370/431, 464, 465; 455/101, 103
See application file for complete search history.

(56) References Cited

U.S. PATENT DOCUMENTS

| | | | | |
|---|---|---|---|---|
| 5,444,697 | A * | 8/1995 | Leung et al. | ............. 370/207 |
| 6,016,329 | A | 1/2000 | Iwasaki | |
| 6,148,045 | A | 11/2000 | Taura et al. | |
| 6,473,467 | B1 * | 10/2002 | Wallace et al. | ............. 375/267 |
| 6,870,826 | B1 | 3/2005 | Ishizu | |
| 2003/0072255 | A1 | 4/2003 | Ma et al. | |
| 2004/0085946 | A1 | 5/2004 | Morita et al. | |
| 2007/0066362 | A1 * | 3/2007 | Ma et al. | |

FOREIGN PATENT DOCUMENTS

| | | |
|---|---|---|
| EP | 1 104 977 | 6/2001 |
| EP | 1 204 234 | 5/2002 |
| EP | 1 221 778 | 7/2002 |
| EP | 1 422 853 | 5/2004 |
| JP | 3-153145 | 7/1991 |
| JP | 10-155004 | 6/1998 |
| JP | 10-513622 | 12/1998 |
| JP | 2000-151547 | 5/2000 |
| JP | 2000-332724 | 11/2000 |

(Continued)

OTHER PUBLICATIONS

Supplementary European Search Report dated May 18, 2007, from the corresponding European Application.

(Continued)

*Primary Examiner*—Dac V. Ha
(74) *Attorney, Agent, or Firm*—Katten Muchin Rosenman LLP

(57) ABSTRACT

In a transmitting method for transmitting a transmit signal sequence by a number of subcarriers, a plurality of subcarriers $F_1, F_2, \ldots F_{NSCH}$ exclusively for a synchronization channel are provided, a signal sequence of synchronization channel SCH is transmitted by the plurality of exclusive subcarriers, and a common pilot CPICH or dedicated signal DPCH is transmitted on the other subcarriers. In this case, the signal sequence of the synchronization channel is subjected to differential encoding processing and the differentially encoded signal sequence is transmitted by the exclusive subcarriers.

20 Claims, 37 Drawing Sheets

FOREIGN PATENT DOCUMENTS

| | | |
|---|---|---|
| JP | 2000-358266 | 12/2000 |
| JP | 2002-232382 | 8/2002 |
| JP | 2002-237795 | 8/2002 |
| JP | 2003-152681 | 5/2003 |
| JP | 2003-179522 | 6/2003 |
| JP | 2005-506757 | 3/2005 |
| WO | WO 96/24995 | 8/1996 |
| WO | WO 99/53667 | 10/1999 |
| WO | WO 03/034642 | 4/2003 |
| WO | WO 2003/034642 | 4/2003 |

OTHER PUBLICATIONS

Noriyuki Maeda, et al. "VSF-OFCDM Using Two-Dimensional Spreading and Its Performance" IEICE Technical Report, vol. 102, No. 86, May 24, 2002, pp. 59-64.

Motohiro Tanno et al. "Cell Search Time Performance of Three-Step Fast Cell Search Algorthm Employing Common Pilot Channel for Forward Link Broadband OFCDM Wireless Access" IEICE Technical Report, vol. 102, No. 206, Jul. 19, 2002, pp. 99-104.

Motohiro Tanno et al. "Three-Step Fast Cell Search Algorithm Utilizing Common Pilot Channel for OFCDM Broadband Packet Wireless Access" IEEE Vehicular Technology Conference, vol. 1 of 4, Conf. 56, Sep. 24, 2002, pp. 1575-1579.

Hiroyuki Atarashi et al. "Performance of VSF-OFCDM with Two-Dimensional Spreading Prioritizing Time Domain Spreading" IEICE Technical Report, vol. 102, No. 150, Jun. 21, 2002, pp. 61-66.

Noriyuki Maeda, et al. "Variable Spreading Factor-OFCDM with Two Dimensional Spreading that Prioritizes Time Domain Spreading for Forward Link Broadband Wireless Access" IEEE Vehicular Technology Conference, vol. 4 of 4, Conf. 57, Apr. 22, 2003, pp. 127-132.

Seunghyeon Nahm et al. "A Synchronization Scheme for Multi-Carrier CDMA System" IEEE International Conference on Atlanta, Jun. 7, 1998, vol. 3, pp. 1330-1334, XP010284579.

A. Johnston et al. Session Initiation Protocol Service Examples, draft-ieft-sipping-service-examples-05. Sipping Working Group Aug. 29, 2003.

Supplementary Partial European Search Report dated Oct. 27, 2006.

Seunghyeon Nahm et al. "A Synchronization Scheme for Multi-Carrier CDMA Systems" IEEE International Conference on Atlanta, Jun. 7, 1998, vol. 3, pp. 1330-1334, XP010284579.

Notification of Reason(s) for Refusal mailed Aug. 29, 2006.

* cited by examiner

FIG. 31 PRIOR ART (a)
PILOT SYMBOLS →

| SUBCARRIER NO. ↓ | 1 | 2 | 3 | 4 | ⋯ k ⋯ | |
|---|---|---|---|---|---|---|
| 1 | $G_1$ | $G_9$ | $G_{17}$ | $G_{25}$ | | |
| 2 | $G_2$ | $G_{10}$ | $G_{18}$ | $G_{26}$ | | |
| 3 | $G_3$ | $G_{11}$ | $G_{19}$ | $G_{27}$ | | |
| 4 | $G_4$ | $G_{12}$ | $G_{20}$ | $G_{28}$ | | |
| 5 | $G_5$ | $G_{13}$ | $G_{21}$ | $G_{29}$ | | |
| 6 | $G_6$ | $G_{14}$ | $G_{22}$ | $G_{30}$ | | |
| 7 | $G_7$ | $G_{15}$ | $G_{15}$ | $G_{31}$ | | |
| 8 | $G_8$ | $G_{16}$ | $G_{24}$ | $G_{32}$ | | |
| 9 | $G_9$ | $G_{17}$ | $G_{25}$ | $G_{33}$ | | |
| m | $G_m(1)$ | $G_m(2)$ | $G_m(3)$ | $G_m(4)$ | ⋯ $G_m(k)$ ⋯ | $G_m(N_p)$ |
| 511 | $G_{511}$ | $G_7$ | $G_{15}$ | $G_{23}$ | | |
| 512 | $G_{512}$ | $G_8$ | $G_{16}$ | $G_{24}$ | | |

(b)
PILOT SYMBOLS →

| SUBCARRIER NO. ↓ | 1 | 2 | 3 | 4 | ⋯ k ⋯ | |
|---|---|---|---|---|---|---|
| 1 | $G_1$ | $G_1$ | $G_1$ | $G_1$ | | $G_1$ |
| 2 | $G_2$ | $G_2$ | $G_2$ | $G_2$ | | $G_2$ |
| 3 | $G_3$ | $G_3$ | $G_3$ | $G_3$ | | $G_3$ |
| 4 | $G_4$ | $G_4$ | $G_4$ | $G_4$ | | $G_4$ |
| 5 | $G_5$ | $G_5$ | $G_5$ | $G_5$ | | $G_5$ |
| 6 | $G_6$ | $G_6$ | $G_6$ | $G_6$ | | $G_6$ |
| 7 | $G_7$ | $G_7$ | $G_7$ | $G_7$ | | $G_7$ |
| 8 | $G_8$ | $G_8$ | $G_8$ | $G_8$ | | $G_8$ |
| 9 | $G_9$ | $G_9$ | $G_9$ | $G_9$ | | $G_9$ |
| m | $G_m$ | $G_m$ | $G_m$ | $G_m$ | ⋯ $G_m$ | $G_m$ |
| 511 | $G_{511}$ | $G_{511}$ | $G_{511}$ | $G_{511}$ | | $G_{511}$ |
| 512 | $G_{512}$ | $G_{512}$ | $G_{512}$ | $G_{512}$ | | $G_{512}$ |

FIG. 34 PRIOR ART
(a)
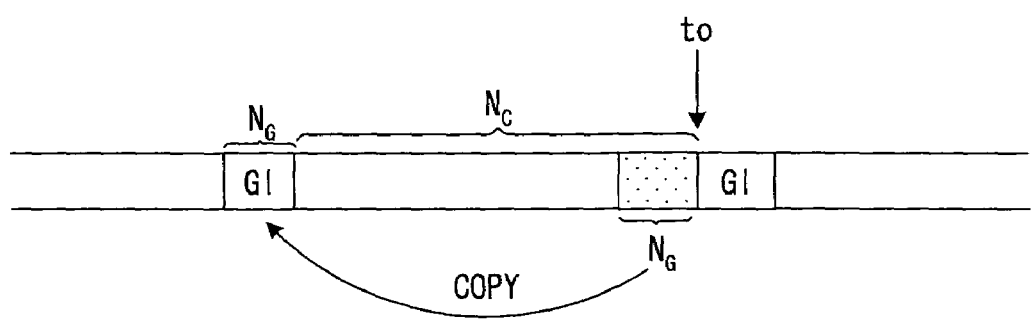
(b)
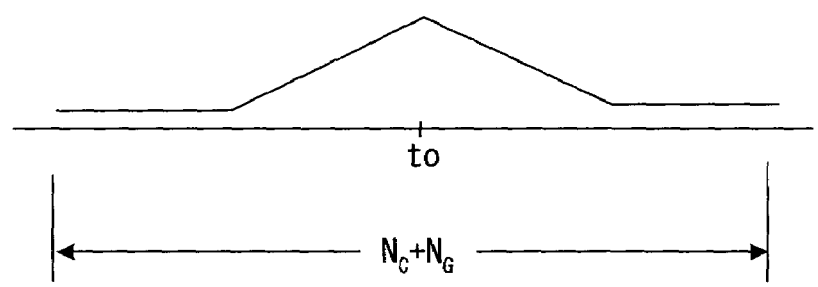

FIG. 35 PRIOR ART
(a)
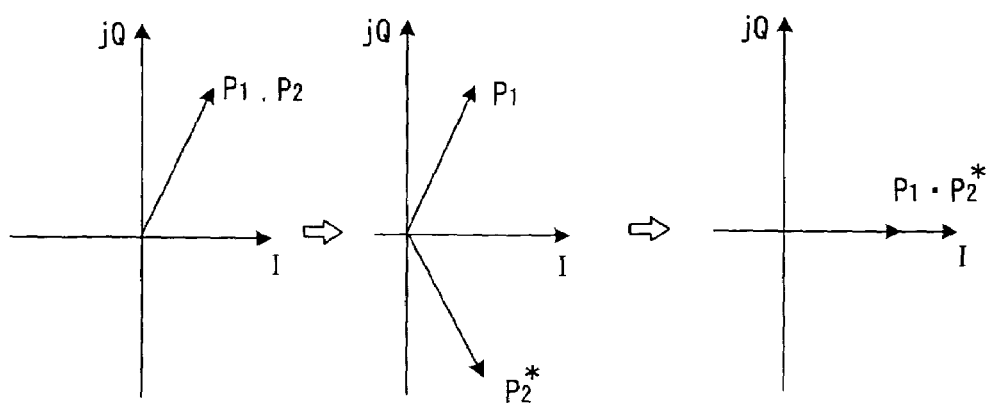
(b)
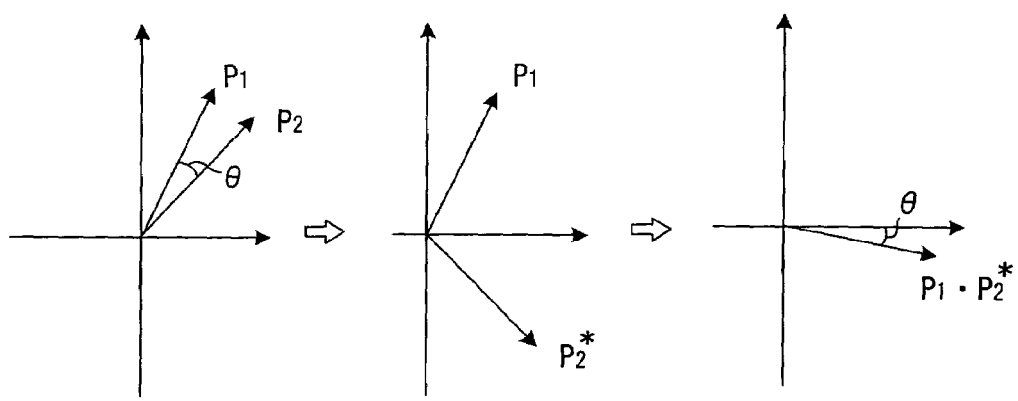

TRANSCEIVER APPARATUS AND TRANSCEIVING METHOD

CROSS-REFERENCE TO RELATED APPLICATION

This application is a continuation of an International Application No. PCT/JP02/08636 which was filed on Aug. 28, 2002, which is herein incorporated by reference.

BACKGROUND OF THE INVENTION

This invention relates to a transceiver apparatus and to transceive broadcasting. More particularly, the invention relates to a transceiver apparatus and transceive broadcasting for transmitting a transmit signal sequence using a number of subcarriers.

Multicarrier modulation schemes have become the focus of attention as next-generation mobile communication schemes. Using multicarrier modulation not only makes it possible to implement wideband, high-speed data transmission but also enables the effects of frequency-selective fading to be mitigated by narrowing the band of each subcarrier. Further, using OFDM (Orthogonal Frequency Division Multiplexing) not only makes it possible to raise the efficiency of frequency utilization but also enables the effects of inter-symbol interference to be eliminated by providing a guard interval for every OFDM symbol.

In recent years, there has been extensive research in multicarrier CDMA schemes (MD-CDMA) and application thereof to next-generation wideband mobile communications is being studied. With MC-CDMA, partitioning into a plurality of subcarriers is achieved by serial-to-parallel conversion of transmit data and spreading of orthogonal codes in the frequency domain.

An orthogonal frequency/code division multiple access (OFDM/CDMA) scheme, which is a combination of OFDM and MC-CDMA, also is being studied. This is a scheme in which a signal, which has been divided into subcarriers by MC-CDMA, is subjected to orthogonal frequency multiplexing to raise the efficiency of frequency utilization.

Principles of Multicarrier CDMA Scheme

According to the principles of multicarrier CDMA, N-number of items of copy data are created from transmit data D of one symbol having a period of Ts, as shown in FIG. 22, the items of copy data are multiplied individually by respective ones of codes $C_1$ to $C_N$, which constitute spreading code (orthogonal code) serving as channelization code, using multipliers $1_1$ to $1_N$, respectively, and products $D \cdot C_1$ to $D \cdot C_N$ undergo multicarrier transmission by N-number of subcarriers of frequencies $f_1$ to $f_N$ illustrated in FIG. 23(a). The foregoing relates to a case where a single item of symbol data undergoes multicarrier transmission. In actuality, however, as will be described later, transmit data is converted to parallel data of M symbols, the M-number of symbols are subjected to the processing shown in FIG. 22, and all results of M×N multiplications undergo multicarrier transmission using M×N subcarriers of frequencies $f_1$ to $f_{NM}$. The total number MN of subcarriers is (spreading factor N)×(parallel-sequence count M). Further, orthogonal frequency/code division multiple access (OFDM/CDMA) can be achieved by using subcarriers having the frequency placement shown in FIG. 23(b).

Structure of MC-CDMA on Transmitting Side (Base Station)

FIG. 24 is a diagram illustrating the structure on the transmitting side (base station) of MC-CDMA. A data modulator 10 for a first user (first channel) modulates transmit data of the first user and converts it to a complex baseband signal (symbol) comprising an in-phase component and a quadrature component. The user data has 32×M symbols per frame, as shown in FIG. 25. A serial/parallel converter 11 converts the input data to parallel data of M symbols, as shown in FIG. 25, and a brancher 12 branches the M-number of symbols into N paths and inputs them to a first spreader 13. The first spreader 13 has M-number of multipliers $14_1$ to $14_M$. The multipliers $14_1$ to $14_M$ multiply the branched symbols individually by the orthogonal codes $C_1, C_2, \ldots, C_N$ of the first user and output the resulting signals. Orthogonal code is a Walsh code that differs for every user and pilot. As a result, subcarrier signals $S_1$ to $S_{MN}$ for multicarrier transmission by N×M subcarriers $f_1$ to $f_{MN}$ are input from first spreader 13 to a code multiplexer 14. That is, the first spreader 13 multiplies the symbols of every parallel sequence by the orthogonal codes $C_1, C_2, \ldots, C_N$ of the first user, thereby performing spreading in the frequency direction and inputting the result to the code multiplexer 14. It should be noted that MN-number of subcarrier signals $S_1$ to $S_{MN}$ constitute an OFDM symbol.

Similarly created subcarrier signals $S_1$ to $S_{MN}$ corresponding to the second to nth users and subcarrier signals $P_1$ to $P_{MN}$ corresponding to the pilot are input to the code multiplexer 14. Since the frame structure of a signal transmitted from a base station is as illustrated in FIG. 26, subcarrier signals of first to nth users and subcarrier signals of the pilot are summed and output on a per-subcarrier basis. That is, the code multiplexer 14 has adders $AD_1$ to $AD_{MN}$ for every subcarrier. An adder $AD_j$ corresponding to a jth subcarrier sums and outputs jth subcarrier signals $S_1$ of the first to nth users and a jth subcarrier signal $P_j$ of the pilot, as illustrated in FIG. 27.

In the diagram of frame structure in FIG. 26, MN-number of subcarriers $f_1$ to $f_{MN}$ are arrayed in the frequency direction (horizontally), Walsh codes of first to nth users (dedicated physical channels DPCH) and pilot (common pilot channel CPICH) are arrayed in the code direction (vertically), 1 to Ns (e.g., 32) OFDM symbol times are arrayed in the time direction (depth direction), and data on a synchronization channel (SCH) is multiplexed onto a plurality (NSCH-number) of discrete subcarriers.

Multipliers $MP_1$ to $MP_{MN}$ of a second spreader 15 multiply code multiplex signals $S'_1$ to $S'_{MN}$ corresponding to the subcarriers that enter from the code multiplexer 14 by scramble codes CSSC (Cell-Specific Scrambling Code) $G_1$ to $G_{MN}$ for cell identification and output the results. A synchronization channel (SCH: Synchronization CHannel) data multiplexer 16 multiplexes synchronization channel data $D_1$ to $D_{NSCH}$ onto a plurality ($N_{SCH}$-number) of discrete carriers and output the results to an IFFT 17. FIG. 28 is a diagram illustrating the structure of an SCH data generator. An SCH data pattern generator 1 generates an SDC data pattern successively, a multiplier 2 multiplies the SCH pattern data by a common scramble code, and a brancher 3 branches one input symbol and inputs $N_{SCH}$-number of items of SCH data $D_1$ to $D_{SCH}$ to the SCH data multiplexer 16.

An IFFT (Inverse Fast Fourier Transform) unit 17 applies IFFT (Inverse Fourier Transform) processing to the subcarrier signals that enter in parallel, thereby effecting a conversion to an OFDM signal (a real-part signal and an imaginary-part signal) on the time axis. A guard-interval insertion unit 18 inserts a guard interval into the OFDM signal, an orthogonal modulator 19 applies orthogonal modulation to the OFDM signal into which the guard interval has been inserted, and a radio transmitter 20 up-converts the signal to a radio frequency, applies high-frequency amplification and transmits the resulting signal from an antenna.

FIG. 29 is a diagram useful in describing insertion of a guard interval. When an IFFT output signal conforming to M×N subcarrier samples (=one effective OFDM symbol) is taken as one unit, guard-interval insertion signifies copying the tail-end portion of this symbol to the leading-end portion thereof. Inserting a guard interval GI makes it possible to eliminate the effects of inter-symbol interference ascribable to multipath.

Structure of MC-CDMA on Receiving Side

FIG. 30 is a diagram illustrating the structure on the receiving side (mobile station) of MC-CDMA. A radio receiver 21 subjects a received multicarrier signal to frequency conversion processing, and an orthogonal demodulator 22 subjects the receive signal to orthogonal demodulation processing. A timing-synchronization/guard-interval removal unit 23 establishes receive-signal timing synchronization, removes the guard interval GI from the receive signal and inputs the result to an FFT (Fast Fourier Transform) unit 24. The FFT unit 24 executes FFT processing at an FFT window timing to thereby convert a signal in the time domain to N×M-number of subcarrier signals (subcarrier samples) $SP_1$ to $SP_{MN}$. A channel estimation unit 25a performs channel estimation on a per-subcarrier basis using the pilot that has been multiplexed onto each subcarrier, and a channel compensation unit 25b multiplies the FFT output by channel estimation signals $CC_1$ to $CC_{MN}$ subcarrier by subcarrier to thereby compensate for fading.

The channel estimation unit 25a multiplies the subcarrier components of the pilot symbol that is output from the FFT unit 24 by the scramble code CSSC for cell identification, sums the results of multiplication on a per-subcarrier basis and calculates the channel estimation values $CC_1$ to $CC_{MN}$ of each of the subcarriers based upon the average value. More specifically, the channel estimation unit 25a estimates the influence exp(jφ) of fading of each subcarrier on phase using the pilot signal, and the channel compensation unit 25b multiplies the subcarrier signal component of the transmit symbol by exp(−jφ) to compensate for fading.

A first despreader 26 multiplies M×N-number of fading-compensated subcarrier signal components individually by scramble codes $G_1$ to $G_{MN}$ for channel identification and outputs the results. More specifically, the fading-compensated signal is despread by the scrambling code for cell identification, whereby the signal transmitted by the base station to which the mobile station belongs is extracted from among the code-multiplexed signals. A second despreader 27 has M-number of multipliers $27_1$ to $27_M$. The multiplier $27_1$ multiplies N-number of subcarrier signals individually by orthogonal codes (Walsh codes) $C_1, C_2, \ldots, C_N$ assigned to users (mobile stations) and outputs the results. The other multipliers $27_2$ to $27_M$ also execute similar processing. As a result, the signal that has been transmitted from the base station to which the mobile station belongs is despread by the spreading code assigned to the user, and the signal directed to the user is extracted from the code-multiplexed signals by such despreading. Combiners $28_1$ to $28_M$ each add the N-number of results of multiplication that are output from respective ones of the multipliers $27_1$ to $27_M$, thereby creating parallel data comprising M-number of symbols. A parallel/serial converter 29 converts this parallel data to serial data, and a data demodulator 30 demodulates the transmit data.

Array of Spreading Codes for Cell Identification

FIG. 31(a) is a diagram useful in describing the scramble codes $G_1$ to $G_{MN}$ (MN=512) for cell identification. The codes are shifted, every OFDM symbol, eight codes at a time in the subcarrier direction. The reason for shifting the codes is as follows: If the codes were not shifted and the codes of the mth subcarriers of the cell-identifying scramble codes CSSC of two stations were the same, then it would no longer be possible to distinguish between the channel estimation values of the mth subcarriers of the two cells and one channel estimation value would be misidentified as the other channel estimation value. For this reason, the cell-identifying scramble codes are shifted, every OFDM symbol, in the subcarrier direction in the manner illustrated in FIG. 31(a).

Necessity of Cell Search and AFC

With OFDM-CDMA, as mentioned above, a cell can be isolated using a scramble code. The same frequency is used at all cells, therefore, so that efficiency of frequency utilization can be improved. However, the scramble codes CSSC of cells (base stations) must be identified (a cell search must be conducted) at the time of reception.

Since the numbers of users of base stations generally differ, the transmission power at each base station differs. Cell search is a technique for detecting a base station for which the amount of attenuation (path loss) of radio waves between the base station and a mobile station is minimized, namely the base station for which the reception power per user is maximized. Since the transmission power at each base station differs, however, the base station for which reception power is maximized is not necessarily the base station of smallest path loss even if the overall reception power from each base station is detected. This makes necessary an effective frame structure in order to detect the base station of minimum path loss at each mobile station, as well as a cell search scheme for detecting this base station.

Further, with an OFDM or OFDM-CDMA scheme, the transmit signal is transmitted upon being divided into a plurality of subcarriers. Since the symbol length of each subcarrier signal can be increased by the division into a plurality of subcarriers, it can be arranged so that there is less susceptibility to delayed waves. If symbol length is increased, however, a drawback is that in the event that a carrier frequency offset occurs, there is increased susceptibility to the effects thereof. What is necessary, therefore, is an AFC technique or a technique that compensates for carrier frequency offset or both.

In addition, in a case where a signal from a mobile station is transmitted, a high precision is sought for the carrier frequency of this transmit signal. Ordinarily, the transmit subcarrier frequency is produced by frequency-dividing it down from the frequency of a voltage-controlled oscillator (VCO) controlled by AFC at the time of reception at the mobile station. It is required, therefore, that the AFC at the time of reception have a high precision.

Conventional AFC Technique

In communication that adopts the OFDM scheme, the frequency of a reference clock signal on the receiving side (the mobile station) must coincide with the frequency of the reference clock signal on the transmitting side (the base station). Usually, however, a frequency deviation Δf exists between the two. The frequency deviation Δf leads to interference between neighboring carriers and causes loss of orthogonality. This means that after the power supply of the receiving apparatus is turned on, it is necessary to apply AFC control immediately to reduce the frequency deviation (frequency offset) and suppress interference.

FIG. 32 is a diagram showing the principal part of a conventional receiving apparatus equipped with an AFC (Automatic Frequency Control) unit that causes the oscillation frequency of a local oscillator to agree with the frequency on the transmitting side. A high-frequency amplifier of the radio receiver 21 amplifies the received radio signal, and a frequency converter/orthogonal demodulator 22 applies frequency conversion processing and orthogonal demodulation processing to the receive signal using a clock signal that enters from a local oscillator 31. An AD converter 32 subjects the orthogonal demodulated signal (I, Q complex signal) to an AD conversion, and the OFDM symbol extraction unit (timing synchronization/guard-interval removal unit) 23 extracts one OFDM symbol, from which the guard interval GI has been removed, and inputs the resultant signal to the FFT unit 24. The latter executes FFT processing at an FFT window timing, thereby converting a signal in the time domain to a signal in the frequency domain. An AFC unit 33 detects the phase error Δθ conforming to the frequency deviation Δf using the receive data, which is the complex signal that enters from the AD converter, and inputs an AFC control signal conforming to this phase error Δθ to the local oscillator 31, whereby the oscillation frequency is made to agree with the oscillation frequency on the transmitting side. That is, the AFC unit 33 calculates a correlation value between a time profile in a guard interval that has been attached to an OFDM symbol, and a time profile of an OFDM symbol portion that has been copied to a guard interval, obtains the phase of the correlation value (complex number) as the frequency deviation Δf between the transmitting apparatus and receiving apparatus, and controls the oscillation frequency based upon this phase to match the oscillation frequency on the transmitting side.

FIG. 33 is a block diagram of the AFC unit 33, and FIG. 34 is a diagram useful in describing the operation of the AFC unit.

A guard interval GI is created by copying a tail-end portion, which is composed of $N_G$-number of samples, of a valid OFDM symbol to the leading-end portion of the valid OFDM symbol, which is composed of $N_c$-number of samples, as illustrated in FIG. 34(a). Therefore, by calculating the correlation between the receive signal that prevailed one valid OFDM symbol earlier ($N_c$ samples earlier) and the currently prevailing receive signal, the correlation value is maximized at the portion of the guard interval GI, as illustrated in FIG. 34(b). Since this maximum correlation value is a value having a phase that is dependent upon the frequency deviation, the phase, namely the frequency deviation, can be detected by detecting the maximum correlation value.

In FIG. 33, a delay unit 33a delays the receive signal by one valid OFDM symbol (sample count $N_c$=512), and a multiplier 33b multiplies the complex conjugate $P_2$* of a receive signal $P_2$ that prevailed one valid OFDM symbol earlier by the currently prevailing receive signal $P_1$ and outputs the result of multiplication. A shift register 33c has a length equivalent to the $N_G$-number of samples (=100 samples) of the guard interval and stores NG (=100) of the latest results of multiplication, and an adder 33d adds the $N_G$-number of multiplication results and outputs a correlation value having a width of $N_G$-number of samples. A correlation-value storage unit 33e stores ($N_G$+$N_C$) (=612) correlation values, staggered one sample at a time, output from the adder 33d. An adder 33f sums the correlation values over 32 symbols within a frame and over several frames in order to raise the S/N ratio and stores the sum in the correlation-value storage unit 33e.

Ideally, the receive signal that prevailed one valid OFDM symbol earlier and the currently prevailing receive signal are the same in the guard interval time. Therefore, the correlation values gradually increase, as depicted in FIG. 34(b), as the number of results of multiplication of the guard interval stored in the shift register 33c increase. When all $N_G$-number of multiplication results in the guard interval have been stored in the shift register 33c, the correlation value reaches it maximum. Thereafter, the number of results of multiplication of the guard interval stored in the shift register 33c decrease and the correlation values gradually decline.

Further, if we assume that there is no noise when the frequency offset Δf=0 holds, $P_1$ and $P_2$ become identical vectors, as shown in FIG. 35(a), and the imaginary part of the output $P_1 \cdot P_2$* of the multiplier 33b becomes zero. However, if there is no noise when the frequency deviation Δf=a holds, then $P_1$ and $P_2$ will not be identical vectors, as shown in FIG. 35(b), and phase rotation θ conforming to the frequency deviation Δf is produced between $P_1$ and $P_2$. As a result, the output $P_1 \cdot P_2$* of the multiplier 33b is rotated by θ and the imaginary part of $P_1 \cdot P_2$* has a value that is non-zero in comparison with the case where Δf=0 holds.

In view of the foregoing, the correlation values output from the adder 33d peak when all $N_G$-number of results of multiplication in the guard interval time have been stored in the shift register 33c, and this maximum value is a complex number having a phase difference θ conforming to the frequency offset Δf.

A peak detector 33g detects a peak correlation value Cmax of maximum correlation power from among the ($N_G$+$N_C$)-number of correlation values that have been stored in the correlation-value storage unit 33e, and a phase detector 33h calculates the phase θ in accordance with the following equation using a real part Re[Cmax] and an imaginary part Im[Cmax] of this correlation value (complex number):

$$\theta = \tan^{-1}\{Im[C\max]/Re[C\max]\} \quad (1)$$

Since the phase θ is produced by the frequency deviation Δf, it is fed back as the control signal of the local oscillator 31 (FIG. 32) based upon the phase θ. It should be noted that by multiplying the phase θ by a variable damping coefficient α (0<α<1) using a multiplier 33i, control is performed so as not to follow up momentary response. Further, the AFC signal is fed back to the local oscillator 31 upon being integrated and smoothed by an integrator 33j, thereby controlling the frequency of the clock signal that is output from the local oscillator 33. A characteristic of this scheme is that synchronization of carrier frequency can be performed ahead of the FFT.

A time-division multiplexing scheme for time-division multiplexing of a pilot into transmit data is available besides the code-multiplexing encoding scheme, which has been described in conjunction with FIG. 26, as a pilot multiplexing scheme. In a case where the time-division multiplexing scheme is employed, carrier-frequency error is detected from the amount of phase rotation of the receive pilot signal after FFT and AFC control is carried out so as to control the oscillation frequency of the local oscillator. FIG. 36 is a diagram of frame structure in the time-division multiplexing scheme. Here a pilot P has been time-multiplexed ahead of one frame of transmit data. It should be noted that the pilot P can also be dispersed within the frame. If the pilot per frame is 4×M symbols and the transmit data is 28×M symbols, then M symbols of the pilot will be output from the serial/parallel converter 12 (FIG. 24) as parallel data the first four times, and thereafter M symbols of the transmit data will be output from the serial/parallel converter 13 as parallel data 28 times. As a result, the pilot can be time-multiplexed into all subcarriers and transmitted four times in the duration of one frame. By using this pilot on the receiving side, it is possible to perform AFC control and to carry out channel estimation/channel compensation subcarrier by subcarrier.

FIG. 37 illustrates an example of implementation of AFC control in time-division multiplexing. Here two pilot signals of an identical symbol are inserted over all subcarriers. On the receiving side, one of the two pilot signals is multiplied by the complex conjugate of the other pilot signal on a per-subcarrier basis following the FFT operation in the FFT operational unit 24. More specifically, on a per-subcarrier basis, a delay unit DLY delays the initial pilot signal by one OFDM symbol, a CNJ calculates the complex conjugate of the delayed pilot signal, and a multiplier MPL multiplies the complex conjugate of the first pilot signal of the successive pilot signals by the second pilot signal and outputs the result. If a phase difference $\theta$ conforming to the frequency deviation $\Delta f$ exists between the first and second pilot signals, the result of multiplication will contain an imaginary part for reasons the same as those described in conjunction with FIG. 35(b), and the result of multiplication rotates by $\theta$ in comparison with the case where $\Delta f=0$ holds. Even if pilot signals of each of the subcarriers differ, the same symbol is transmitted by each subcarrier and therefore the result of calculation ideally is the same signal. A mean-value calculation unit MEN, therefore, calculates the mean value of every real part and imaginary part of results of calculation for all subcarriers, and a phase detector PDT calculates the phase $\theta$ according to Equation (1) using the real part Re[Cmax] and the imaginary part Im[Cmax]. Since the phase $\theta$ is produced owing to the frequency deviation $\Delta f$, the oscillation frequency of the local oscillator 31 (FIG. 32) is controlled based upon the phase $\theta$.

Conventional Cell Search Technique

A cell search associated with the frame structure shown in FIG. 26 comprises a three-stage procedure, as illustrated in FIG. 38. FFT window timing is detected in the first stage (step S1), SCH frame timing is detected in the second stage (step S2), and the CSSC (cell-identifying scramble code) is identified in the third stage (step S3).

In the first stage, guard-interval correlation (see FIG. 39) is calculated by an arrangement similar to that of the AFC unit in FIG. 33 to thereby detect two peak values of correlation above a set value TH1, and these peak values are adopted as FFT window-timing candidates 1, 2.

In the second stage, optimum frame timing is detected from 32 frame phases utilizing the SCH with regard to each of the candidates for FFT window timing. More specifically, the following processing is executed for the two FFT window-timing candidates detected in the first stage. That is, the FFT is implemented with regard to received waves at the first timing of the FFT window-timing candidates, and the signal obtained by the FFT is stored in memory. The SCH data is multiplexed onto user data or pilot data on a plurality of discrete subcarriers, as indicated by the SCH frame format of FIG. 40. After the FFT, therefore, the system calculates, in relation to subcarriers to which each SCH has been assigned, one frame's worth (=32 OFDM symbols) of time correlation between the post-FFT signal, which has been stored in memory, and a signals of a sequence obtained by sequentially shifting the phase of the known SCH signal sequence. The average value of correlation values of eight subcarriers is then found by power averaging, and the average power of a plurality of frames is calculated as necessary. The calculation of correlation value is performed with regard to each pattern obtained by shifting the phase of the known SCH signal sequence by 0, 1, 2, ..., 31 OFDM symbols, and the correlation power values regarding frame-timing candidates of 32 phases are stored in memory. This is followed by selecting the frame timing having the largest correlation power value among the 32 phases and adopting this as a frame-timing candidate for one FFT window-timing candidate. Similar processing for deciding frame-timing candidates is executed with regard to each FFT window-timing candidate.

In the third stage, detection of CSSC number and decision of FFT window timing and frame timing are performed with regard to the candidates detected up to the second stage. That is, each receive subcarrier is multiplied by complex conjugates of a number of known CSSC candidates and of the CPICH and integration is performed along the time direction to thereby obtain a correlation value for every subcarrier, correlation values are averaged in a subcarrier block comprising several subcarriers, correlation average values are power-added over all subcarriers to thereby obtain a metric regarding CSSC candidates, and a CSSC candidate for which the metric is maximized is adopted as the CSSC of the base station to be connected.

Problem to be Solved by the Invention

With AFC control that extracts a phase error, which is caused by carrier frequency offset, by guard interval correlation described in FIGS. 32 to 35, the correlation is taken with respect to a signal spaced away by the Nc sample length (one OFDM symbol). If the carrier frequency offset becomes small, therefore, phase error becomes embedded in noise and phase error can no longer be detected precisely. In particular, with AFC control, a time constant is set to be long for the sake of stable operation. If there is a residual carrier frequency offset, therefore, a problem which arises is that even if rotation of the carrier phase is small in one OFDM symbol interval, carrier phase rotates a great deal between the initial symbol of one frame comprising several tens of OFDM symbols and the final symbol.

Further, in a case where a precision greater than that of the carrier frequency obtained guard-interval correlation and AFC control is required for the carrier frequency of the transmit signal on the side of the mobile station, a problem which arises is that synchronization of carrier frequency is unsatisfactory.

Further, the AFC scheme shown in FIG. 37, in which a known signal is inserted into the transmit signal and carrier frequency error is detected from the amount of phase rotation of the received known signal after FFT, is such that the channel model is limited to multipath fading and noise. Consequently, in an environment in which identical channel interference is also received from other cells, as in OFDM-CDMA, the known signal also is influenced by identical channel interference and a problem which arises is a decline in phase-error detection precision ascribable to carrier frequency offset. Further, since phase error over the course of one OFDM symbol is estimated by the method shown in FIG. 37, more precise estimation of phase error is difficult. In addition, even if the pilot-symbol interval is widened, phase-error detection precision is fixed by the pilot-symbol interval and flexibility is lacking.

Further, in a conventional cell search, usually a cell-search algorithm is started after a voltage-controlled oscillator (VCO) is first pulled in to the carrier frequency by AFC. In a cell search, however, calculation for voltage addition is used in order to detect various timings. In particular, with the conventional cell search, calculation of correlation between signal of sequences obtained by sequentially shifting the phase of a known SCH signal sequence and the received SCH signal is performed over the length of one frame. Consequently, it may be predicted that if carrier frequency synchronization by AFC is unsatisfactory, the receive signal will rotate owing to residual frequency error and the effect of voltage addition in the correlation calculation will diminish, as a result of which a satisfactory frame-timing detection characteristic will not be obtained.

Further, with the frame structure of code multiplexing shown in FIG. 26, the SCH (Synchronization Channel) is further multiplexed onto a signal obtained by multiplexing the DPCH (Dedicated Physical Channel) and the CPICH (Common Pilot Channel). However, since the SCH is not orthogonal to the DPCH and CPICH, interference is received from the DPCH and CPICH when SCH frame timing is detected by the correlation operation. In order to mitigate these effects, it is necessary to power-add the correlation values over several further frames and, hence, detection of SCH frame timing takes time. Further, since the phase of channel response on each SCH differs when SCHs that have been multiplexed onto a plurality of subcarriers are combined, addition of voltages cannot be performed and it is necessary to combine the SCHs by adding power. A problem which arises is that the effectiveness of combining obtained is not as great as in the case of voltage addition. FIG. 41 is a diagram useful in describing a voltage-addition area and a power-addition area in processing for detecting SCH frame timing. A voltage-addition area is one in which correlation values in areas where the phase difference of correlation values is small, namely in m×n areas specified by n OFDM symbol intervals (e.g., n=4) in the time-axis direction and n subcarrier intervals (e.g., m=8) in the subcarrier direction, can be voltage-added and the average value obtained. However, a correlation value inside the voltage-addition area and a correlation value outside the voltage-addition area cannot be voltage-added and averaged because the phase difference becomes large. Power addition is performed and the average value obtained. That is, the area outside the voltage-addition area is the power-addition area.

Furthermore, in the example of the prior art, each receive subcarrier signal is multiplied by the complex conjugates of the CSSC candidates and of the CPICH and the results are integrated in concurrence with CSSC identification processing. In a case where the CSSC is positive, the integrated value obtained is adopted as the channel estimation value of each subcarrier. If the number of users is large, however, a problem which arises is that interference from the DPCH increases and error of the channel estimation value grows larger. A further problem is that in order to raise the precision of channel estimation, it is necessary to increase the number of integrated symbols in the time direction. This problem arises because a spreading area SPA and a channel-response estimation area CEA do not coincide, as illustrated in FIG. 41. Further, in a case where a receive subcarrier signal is rotating owing to residual frequency offset, channel estimation precision declines. It is predicted, therefore, that CSSC identification probability declines.

SUMMARY OF THE INVENTION

Accordingly, an object of the present invention is to so arrange it that SCH frame timing can be detected accurately even in a case where carrier frequency synchronization ascribable to guard-interval correlation is unsatisfactory and residual carrier-frequency error is not negligible.

A further object of the present invention is to so arrange it that highly precise carrier-frequency synchronization can be realized and residual carrier frequency offset compensated for even in a case where interference from other cells is present.

A further object of the present invention is to make it possible to perform channel estimation and CSSC identification without interference from a DPCH.

In a case where a transmit signal sequence is transmitted by a number of subcarriers, a plurality of subcarriers exclusively for a synchronization channel are provided, a signal sequence on the synchronization channel is transmitted by the plurality of exclusive subcarriers, and a common pilot or dedicated signal is transmitted on the other subcarriers. If this arrangement is adopted, the synchronization channel SCH will not be acted upon by interference from a dedicated physical channel DPCH or common pilot channel CPICH, and SCH frame timing can be detected accurately.

Further, differential encoding processing is applied to the signal sequence of the synchronization channel, and the differentially encoded signal sequence is transmitted by the exclusive subcarriers. If this arrangement is adopted, frame timing can be detected even in a case where phase error ascribable to frequency offset is large. Moreover, phase error can be multiplied by a factor of M by applying differential decoding processing over M symbols. As a result, discrimination of polarity can be performed correctly even if phase error is small, and control can be exercised in such a manner that frequency offset is nulled based upon the polarity of phase error.

Further, signal sequences of DPCH and CPICH are spread in two-dimensional areas of frequency and time, the spread signals of the two-dimensional areas are multiplied by complex conjugates of a pilot and cell-identifying scramble codes CSSC, summing is performed to thereby calculate correlation, and channel response of the two-dimensional areas is estimated based upon the correlation value. If this arrangement is adopted, the spreading areas and channel estimation areas can be made the same. As a result, there is no interference from the DPCH, channel estimation precision can be improved and accurate channel compensation becomes possible. Further, correlation voltages of a plurality of the two-dimensional areas are added and averaged and a plurality of average correlation voltages are power-added, thereby making it possible to enlarge the difference between a power value with respect to a CSSC of a cell to be connected and a power value with respect to a CSSC of another cell. As a result, CSSC identification can be performed more accurately.

BRIEF DESCRIPTION OF THE DRAWINGS

FIG. 31 is a diagram useful in describing cell-identifying scramble codes;

FIG. 34 is a diagram useful in describing the operation of the AFC unit;

FIG. 35 is a diagram useful in describing phase error;

DESCRIPTION OF THE PREFERRED EMBODIMENTS

(A) Frame Structure of the Present Invention

Figure 1:
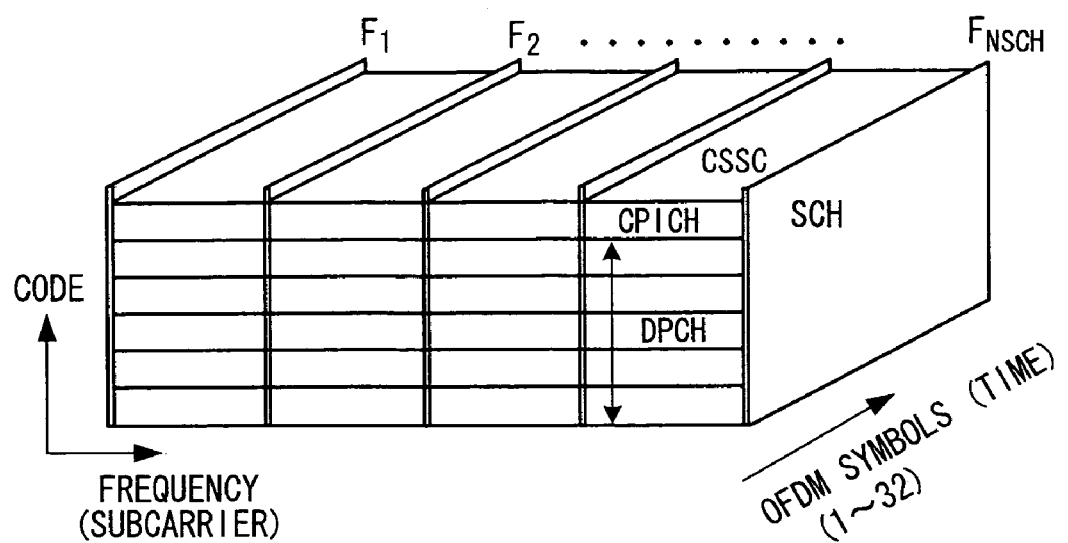
FIG. 1 is a diagram useful in describing frame structure of a signal transmitted from a base station of the present invention.

FIG. 1 is a diagram useful in describing frame structure of a signal transmitted from a base station of the present invention. Subcarriers are arrayed in the frequency direction (horizontally), Walsh codes of first to nth dedicated physical channels (DPCH) and common pilot channel (CPICH) are arrayed in the code direction (vertically), and 1 to Ns (e.g., Ns=32) OFDM symbol times are arrayed in the time direction (depth direction). Further, a plurality of subcarriers $F_1$ to $F_{NSCH}$ exclusively for the synchronization channel SCH are assigned to the SCH. The length of the synchronization channel SCH is the frame length (=32 OFDM symbols). That is, the subcarriers $F_1$ to $F_{NSCH}$ are exclusively for SCH, and other subcarriers are assigned to the spread signals of DPCH or CPICH.

Figure 2:
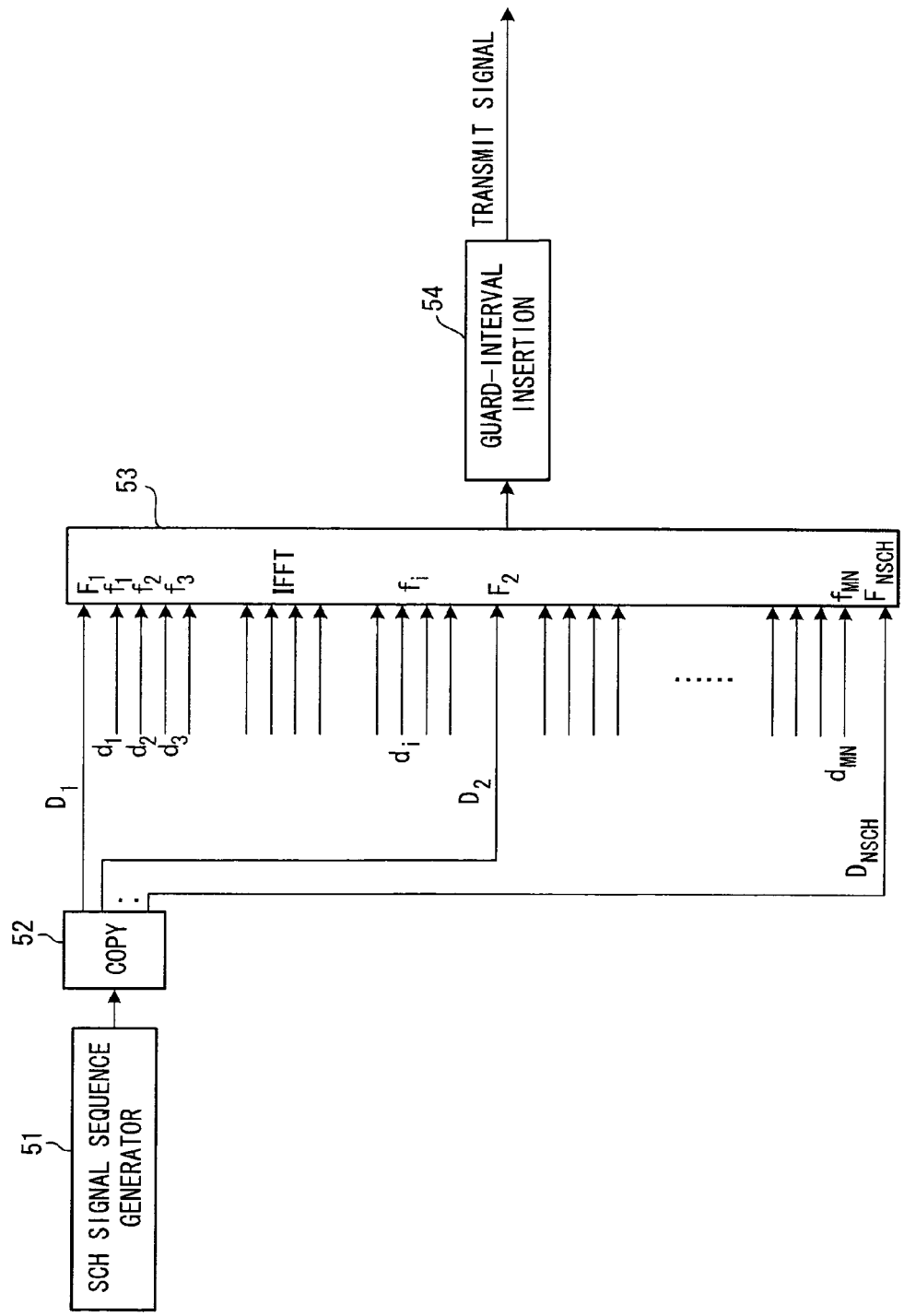
FIG. 2 is a diagram useful in describing the relationship between exclusive subcarriers of a synchronization channel SCH and subcarriers for a DPCH or CPICH.

FIG. 2 is a diagram useful in describing the relationship between the exclusive subcarriers $F_1$ to $F_{NSCH}$ of the synchronization channel SCH and subcarriers for DPCH or CPICH. An SCH signal sequence generator 51 generates an SCH signal sequence of one frame and Ns symbols, and a copying unit 52 generates $N_{SCH}$-number of copy symbols $D_1$ to $D_{NSCH}$ from the SCH signal of one symbol and inputs the copy symbols $D_1$ to $D_{NSCH}$ to an IFFT unit 53 as the signals of subcarriers $F_1$ to $F_{NSCH}$. Further, multiplexed signals $d_1$ to $d_{MN}$ of the dedicated physical channel DPCH and common pilot channel CPICH, which have been obtained by spreading by channelization code in the frequency direction using a spreader (not shown) followed by masking by cell-identifying scramble code, are input to the IFFT unit 53 as subcarrier signals $f_1$ to $f_N$ other than the above-mentioned exclusive subcarriers $F_1$ to $F_{NSCH}$. The IFFT unit 53 applies IFFT (Inverse Fast-Fourier Transform) processing to the subcarriers signals, which are input in parallel, and converts these signals to an OFDM symbol signal on the time axis. A guard-interval insertion unit 54 inserts a guard interval into the OFDM symbol signal, and a transmitting unit (not shown) applies orthogonal modulation to the OFDM signal into which the guard interval has been inserted, up-converts the signal to a radio frequency, applies high-frequency amplification and transmits the resulting signal from an antenna.

Since the synchronization channel SCH is assigned to the exclusive subcarriers in the manner described above, the SCH will not receive interference from the DPCH and CPICH. As a result, an SCH frame-timing detection characteristic, which will be described later, can be improved. Further, when an SCH frame-timing detection characteristic on the scale of that of the example of the prior art is obtained, detection can be performed with a small number of frames and the time required for detection of frame timing can be shortened.

(B) Differential Encoding of SCH Signal Sequence and Detection of Frame Timing By applying differential encoding processing to the SCH signal sequence, SCH frame timing can be detected accurately even in a case where carrier frequency synchronization based upon guard-interval correlation is unsatisfactory and residual carrier-frequency error is not negligible.

Figure 3:
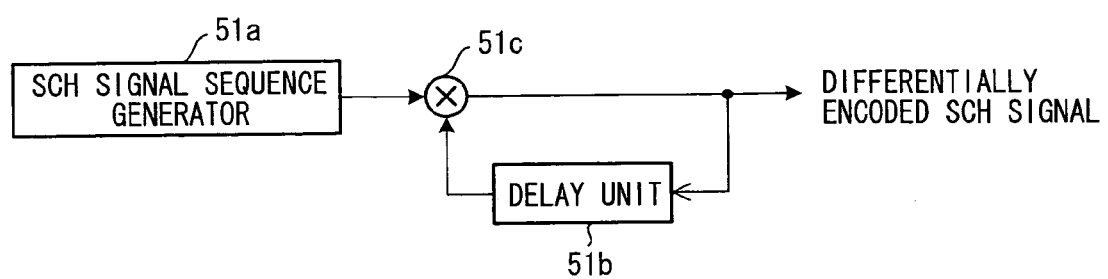
FIG. 3 is a diagram showing the structure of a differentially-encoded SCH signal sequence generator of the present invention.

FIG. 3 is a diagram showing the structure of a differentially-encoded SCH signal sequence generator of the present invention. An SCH signal sequence generator 51a generates a sequence having an excellent autocorrelation characteristic, a delay unit 51b delays the input signal for the duration of one symbol, and a multiplier 51c applies differential encoding to the SCH signal sequence by multiplying the SCH signal by the output signal that prevailed one symbol earlier.

For example, if we assume that the SCH signal sequence is a BPSK modulation signal and that this signal sequence is $b(\kappa) \in (1,-1)$, $\kappa=1, 2, \ldots, Ns$ (where Ns represents the number of frame symbols per subcarrier), then the differentially encoded signal sequence will be represented by the following:

$$c(\kappa) = b(\kappa)c(\kappa-1) \quad (2)$$

In a case where a carrier frequency offset exists, the mth subcarrier signal is as follows:

$$r_m(\kappa) = h_m c(\kappa+\phi) \exp(j2\pi\Delta f_C T_{SB} k) \quad (3)$$

where $h_m$, $\Delta f_c$ and $T_{SB}$ represent channel response on the mth channel, carrier frequency offset and symbol block time, respectively. If differential decoding is applied to this receive signal sequence, then we have the following:

$$d_m(\kappa) = r_m(\kappa) r_m^*(\kappa-1) \quad (4)$$
$$= |h_m|^2 c(\kappa+\phi) c(\kappa+\phi-1) \exp(j2\pi\Delta f_C T_{SB})$$
$$= |h_m|^2 b(\kappa+\phi) \exp(j2\pi\Delta f_C T_{SB})$$

Since the phase $\phi$ of the receive signal sequence is unknown, correlator output is expressed as follows when correlation is calculated with respect to a sequence $b(\kappa+\psi)$ obtained by sequentially shifting the phase of the signal sequence $b(\kappa)$ prior to differential encoding:

$$R_m(\psi) = \frac{1}{N} \sum_{\kappa=1}^{N_S} |h_m|^2 b(\kappa+\phi) \exp(j2\pi\Delta f_C T_{SB}) \cdot b(\kappa+\psi) \quad (5)$$

If the phase $\psi$ of $b(\kappa)$ applied by the correlator does not agree with the phase $\phi$ of the receive signal sequence, then $b(\kappa+\phi) \cdot b(\kappa+\psi)$ becomes 1 or −1 and does not become a factor of $N_S$ even if addition is performed over $N_S$ symbols. On the other hand, when the phase $\psi$ of $b(\kappa)$ agrees with the phase of the receive signal sequence, $b(\kappa+\phi)-b(\kappa+\psi)$ always becomes 1 and addition is performed over all $N_S$ symbols. As a result, $|R_m(\psi)|^2$ increases. Accordingly, the phase for which the power of $R_m(\psi)$ increases can be detected as the frame timing.

Further, the subcarrier signal $r_m(k)$ is rotating owing to the carrier frequency offset $\Delta fc$. However, by performing differential decoding, a conversion to the same amount of phase shift is performed whenever differential decoding is carried out. Accordingly, even though addition is performed by the correlator, there is no loss of power and frame timing can be detected accurately as a result.

Furthermore, in a case where radio waves from two cells (two base stations) are being received strongly, we have the following:

$$r_m(\kappa) = \{h_{1,m} c(\kappa+\phi) + h_{2,m} c(\kappa+\varphi)\} \exp(j2\pi\Delta f_C T_{SB} k) \quad (6)$$

If differential decoding is performed in similar fashion, then we have $$d_m(\kappa) = r_m(\kappa) r_m^*(\kappa-1) \quad (7)$$
$$= \{|h_{1,m}|^2 b(\kappa+\phi) + |h_{2,m}|^2 b(\kappa+\varphi) +$$
$$h_{1,m} h_{2,m}^* c(\kappa+\phi) c(\kappa+\varphi-1) +$$
$$h_{1,m}^* h_{2,m} c(\kappa+\varphi) c(\kappa+\phi-1)\} \exp(j2\pi\Delta f_C T_{SB})$$

Since the phase $\phi$ or $\varphi$ of the receive signal sequence is unknown, correlator output is expressed as follows when correlation is calculated with respect to the sequence $b(\kappa+\psi)$ obtained by sequentially shifting the phase of the signal sequence $b(\kappa)$ prior to differential encoding:

$$R_m(\psi) = \frac{1}{N_S} \sum_{\kappa=1}^{N_S} \{|h_{1,m}|^2 b(\kappa+\phi) + |h_{2,m}|^2 b(\kappa+\varphi) + \quad (8)$$
$$h_{1,m} h_{2,m}^* c(\kappa+\phi) c(\kappa+\phi-1) +$$
$$h_{1,m}^* h_{2,m} c(\kappa+\varphi) c(\kappa+\phi-1)\}$$
$$\exp(j2\pi\Delta f_C T_{SB}) \cdot b(\kappa+\psi)$$

When the phase $\psi$ of $b(\kappa)$ agrees with the phase $\psi$ of the receive signal sequence, we have $$R_m(\psi) = |h_{1,m}|^2 \exp(j2\pi\Delta f_C T_{SB}) + \xi_{1,m} \quad (9a)$$

When the phase $\psi$ of $b(\kappa)$ agrees with the phase $\phi$ of the receive signal sequence, we have $$R_m(\psi) = |h_{2,m}|^2 \exp(j2\pi\Delta f_C T_{SB}) + \xi_{2,m} \quad (9b)$$

where $\xi_1$ and $\xi_2$ represent signal components that cannot be fully suppressed by correlation. Accordingly, if the phase for which the power of the correlator output is largest is adopted as the SCH frame timing, it is possible to detect the frame timing of the transmit signal from the base station having the larger channel response, namely the base station for which path loss is smallest.

Furthermore, in a case where the SCH has been assigned to a plurality of subcarriers, the correlator output will be as follows if the differential decoder outputs are combined:

$$R(\psi) = \sum_{m=1}^{N_{SCH}} R_m(\psi) \tag{10}$$

As a result, it becomes possible to reduce the probability that frame timing will be detected from a cell for which path loss is not smallest owing to the effects of fading over a short interval.

Figure 4:
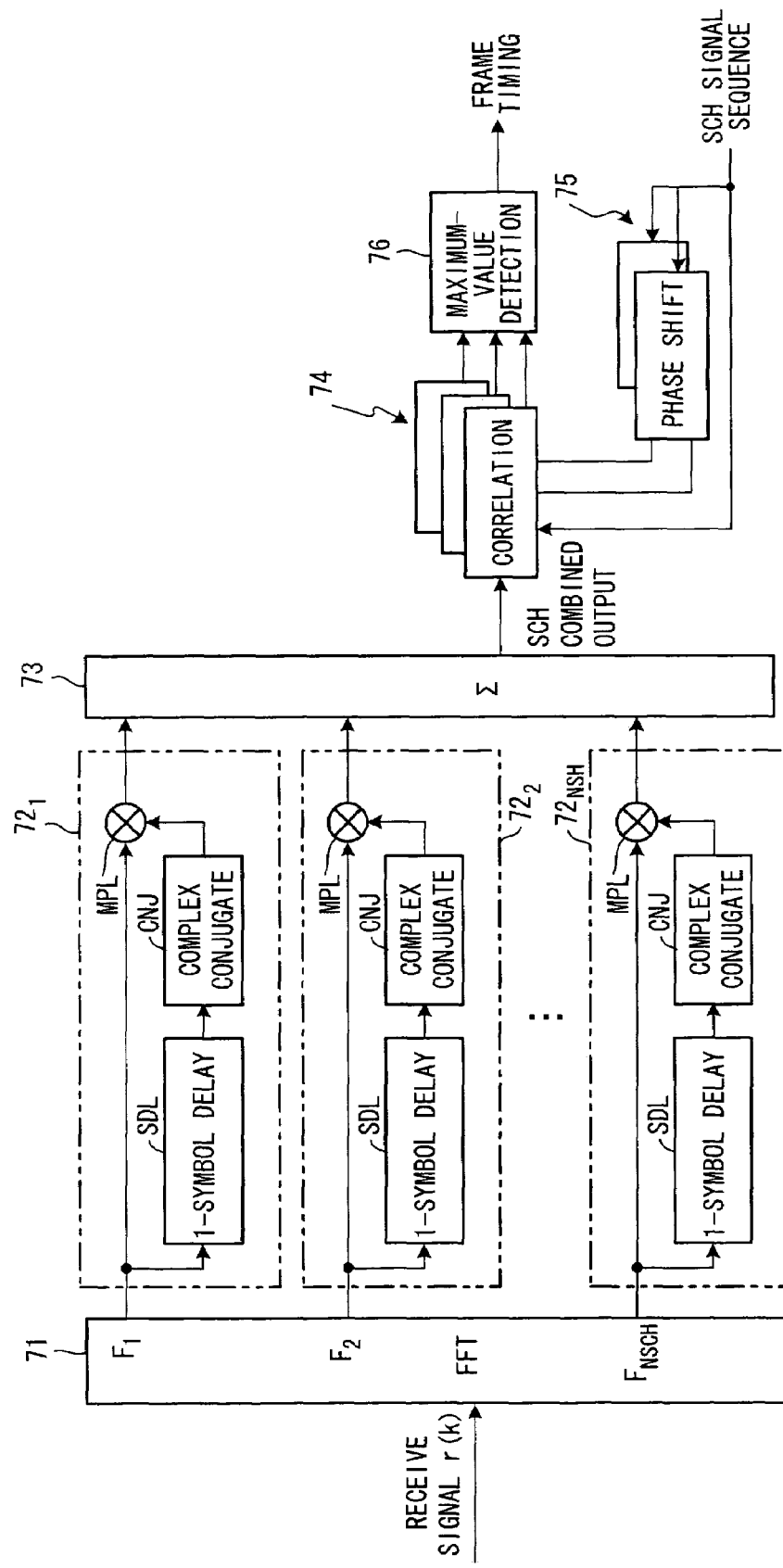
FIG. 4 is a diagram illustrating an arrangement for combining SCH and detecting frame timing in a receiving apparatus according to the present invention.

FIG. 4 is a diagram illustrating an arrangement for combining SCH and detecting frame timing in a receiving apparatus according to the present invention. Differential decoders $72_1$ to $72_{N_{SCH}}$ differentially decode signals of subcarriers $F_1$ to $F_{N_{SCH}}$ to which SCH has been assigned from among a number of subcarriers output from an FFT calculation unit 71, and an adder 73 adds the differentially decoded signals. Next, a correlator 74 calculates correlation between the SCH combined signal sequence output from the adder 73 and a known SCH signal sequence while sequentially shifting the phase of the latter by a phase shifter 75, and a maximum-value detector 76 detects the phase for which the correlator output is maximized as the frame timing. It should be noted that the correlator 74 performs the correlation operations indicated by Equations (8), (10). Further, the differential decoders $72_1$ to $72_{N_{SCH}}$ each comprise a single-symbol delay unit SDL, a complex conjugate generator CNJ and a multiplier MPL.

(C) Detection of Frame Timing Based Upon CMA

In the present invention, SCH is assigned to a plurality of exclusive subcarriers, and the SCH is common to all cells. If the timing between base stations is asynchronous, therefore, a plurality of SCH signals having different timings and channel responses are multiplexed and received. This is the same as a model in which one signal sequence is transmitted and direct waves and delayed waves are received by a plurality of antennas. A CMA (Constant Modulus Algorithm) is known as an algorithm that extracts a path of maximum power while suppressing other paths. Accordingly, in the present invention, receive signals on a plurality of subcarriers for SCH are weighted by complex numbers and combined, and weighting coefficients are updated so as to minimize the error between the combined signal power and desired power.

Figure 5:
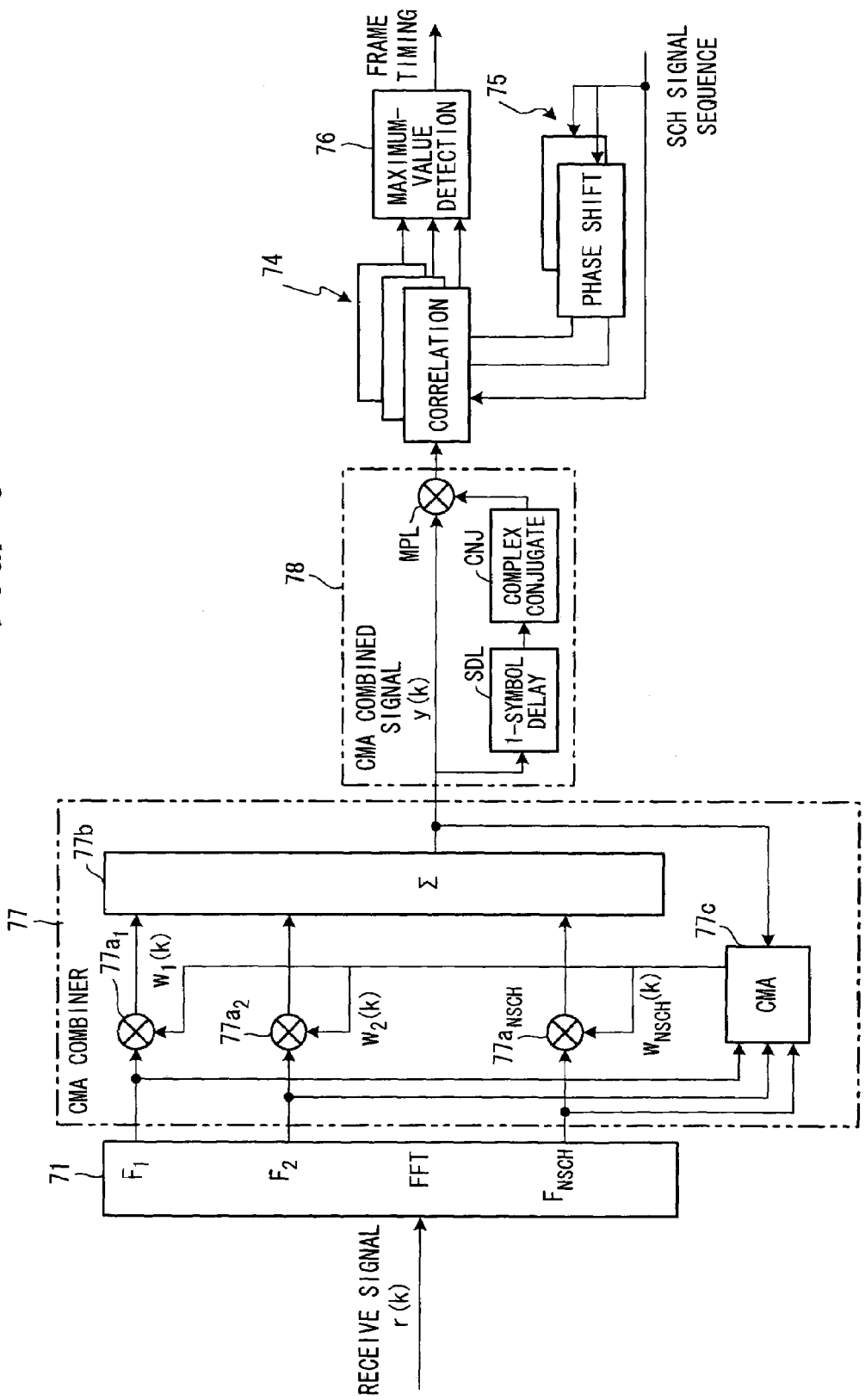
FIG. 5 is a diagram illustrating an arrangement for combining SCH by a CMA algorithm and detecting frame timing in the present invention.

FIG. 5 is a diagram illustrating an arrangement for combining SCH by the CMA algorithm and detecting frame timing in the present invention. The CMA algorithm is an algorithm of an adaptive array that selects the signal having the greatest signal power. In FIG. 5, weighting is performed by adaptive control in such a manner that the SCH of greatest signal power is received from among the SCHs sent from a plurality of base stations while the other SCH signals are cancelled out.

Multipliers $77a_1$ to $77a_{N_{SCH}}$ of a CMA combiner 77 multiply signals of subcarriers $F_1$ to $F_{N_{SCH}}$ to which SCH has been assigned from among a number of subcarriers output from the FFT calculation unit 71, by weighting coefficients $w_1(k)$ to $w_{N_{SCH}}(k)$, a combiner 77b combines the outputs of the multipliers, and a CMA processing unit 77c updates the weighting coefficients $w_1(k)$ to $w_{N_{SCH}}(k)$ in accordance with the CMA algorithm so as to diminish the error between the combined output power and the desired output power.

More specifically, if we assume that the signal of an mth subcarrier to which SCH has been assigned is $x_m(\kappa)$ at time $\kappa$, then the output signal of the combiner 77b will be expressed by the following:

$$y(\kappa) = \sum_{m=1}^{N_{SCH}} w_m x_m(\kappa) \tag{11}$$

and the error signal is given by the following:

$$e(\kappa) = ||y(\kappa)|^p - 1|^q \tag{12}$$

where p and q are parameters that give the convergence characteristic of the algorithm. A coefficient vector $W=[w_1, w_2, \ldots, w_{N_{SCH}}]^T$ is updated as follows:

$$W = W + \mu e^*(\kappa) X(\kappa) \tag{13}$$

where μ represents step size, * the complex conjugate and $X(\kappa)$ the receive signal vector of the subcarrier to which SCH has been assigned. If the weighting coefficients converge, only the SCH signal sequence for which the path loss is the smallest is output as the combined output, and the signals from other base stations are suppressed. Accordingly, when the combined output is differentially decoded, unwanted signal components are not produced. As a result, detection of SCH frame timing can be performed more accurately by the correlation operation of the final stage.

After the weighting coefficients converge, a differential decoder 78 differentially decodes the CMA combined output signal, the correlator 74 calculates correlation between the CMA combined signal sequence output from the differential decoder 78 and the known SCH signal sequence while sequentially shifting the phase of the latter by a phase shifter 75, and a maximum-value detector 76 detects the phase for which the correlator output is maximized as the frame timing. It should be noted that the differential decoder 78 comprises a single-symbol delay unit SDL, a complex conjugate generator CNJ and a multiplier MPL.

(D) Control for Highly Precise Phase-error Detection

In FIGS. 4 and 5, the correlation operation is performed after differential decoding is carried out. Consequently, the amount of phase shift of the correlation value at the detected frame timing becomes the amount of rotation of the carrier frequency offset in one symbol block. The amount of phase shift, e.g., amount of phase shift $\Delta\theta = 2\pi\Delta f_c TS_B$ of $R_m(\psi) = |h_{1,m}|^2 \exp(j2\pi\Delta f_c T_{SB}) + \zeta_{1,m}$ in Equation (9a), can be detected according to the following equation:

$$\Delta\theta = \tan^{-1} \frac{\text{Im}(R_m(\psi))}{\text{Re}(R_m(\psi))} \tag{14}$$

If the carrier frequency offset is small, detection precision of $\Delta\theta$ or of the polarity of $\Delta\theta$ declines owing to noise or signal components that have not been completely suppressed. The time when it is most difficult for the precision with which the polarity of Δθ is discriminated to decline owing to noise or the like is when Δθ which is farthest from 0 serving as the boundary value of polarity discrimination, is ∈π/2. Accordingly, the number M of symbol intervals of differential decoding in high-precision AFC of the final stage is decided as follows:

$$M = \frac{\pi}{2|\Delta\theta|} \quad (15)$$

If this arrangement is adopted, Δθ is multiplied by M and becomes ±π/2. Even if Δθ is small, therefore, the polarity thereof can be detected more correctly and it is possible to exercise carrier frequency control in highly precise fashion.

In view of the foregoing, the correlation operation is performed after the differential decoding of a plurality of symbol internals M is carried out in the differential decoding unit of FIGS. 4 and 5. For example, if M mentioned above satisfies M=2, then the result $d_m(\kappa)$ of differential decoding becomes as follows:

$$\begin{aligned}d_m(\kappa) &= r_m(\kappa)r_m^*(\kappa-2) \quad (16)\\ &= |h_m|^2 c(\kappa+\phi)c(\kappa+\phi-2)\exp(j2\pi\Delta f_C T_{SB}M)\\ &= |h_m|^2 b(\kappa+\phi)c(\kappa+\phi-1)c(k+\phi-2)\\ &\quad \exp(j2\pi\Delta f_C T_{SB}M)\\ &= |h_m|^2 b(\kappa+\phi)b(\kappa+\phi-1)\exp(j2\pi\Delta f_C T_{SB}M)\end{aligned}$$

The frame timing has already been detected. If the correlation operation is performed at this timing, therefore, we have the following:

$$\begin{aligned}R_m(\phi) &= \frac{1}{N_S}\sum_{k=1}^{N_S} d_m(\kappa)\cdot b(\kappa+\phi)b(\kappa+\phi-1) \quad (17)\\ &= |h_m|^2 \exp(j2\pi\Delta f_C T_{SB}M)\end{aligned}$$

and the amount of phase shift is enlarged by a factor of M. Accordingly, in a case where the resolution of detection of amount of phase shift is unsatisfactory owing to noise or the like, the present invention makes it possible to improve greatly the discrimination of phase-shift polarity.

Figure 6:
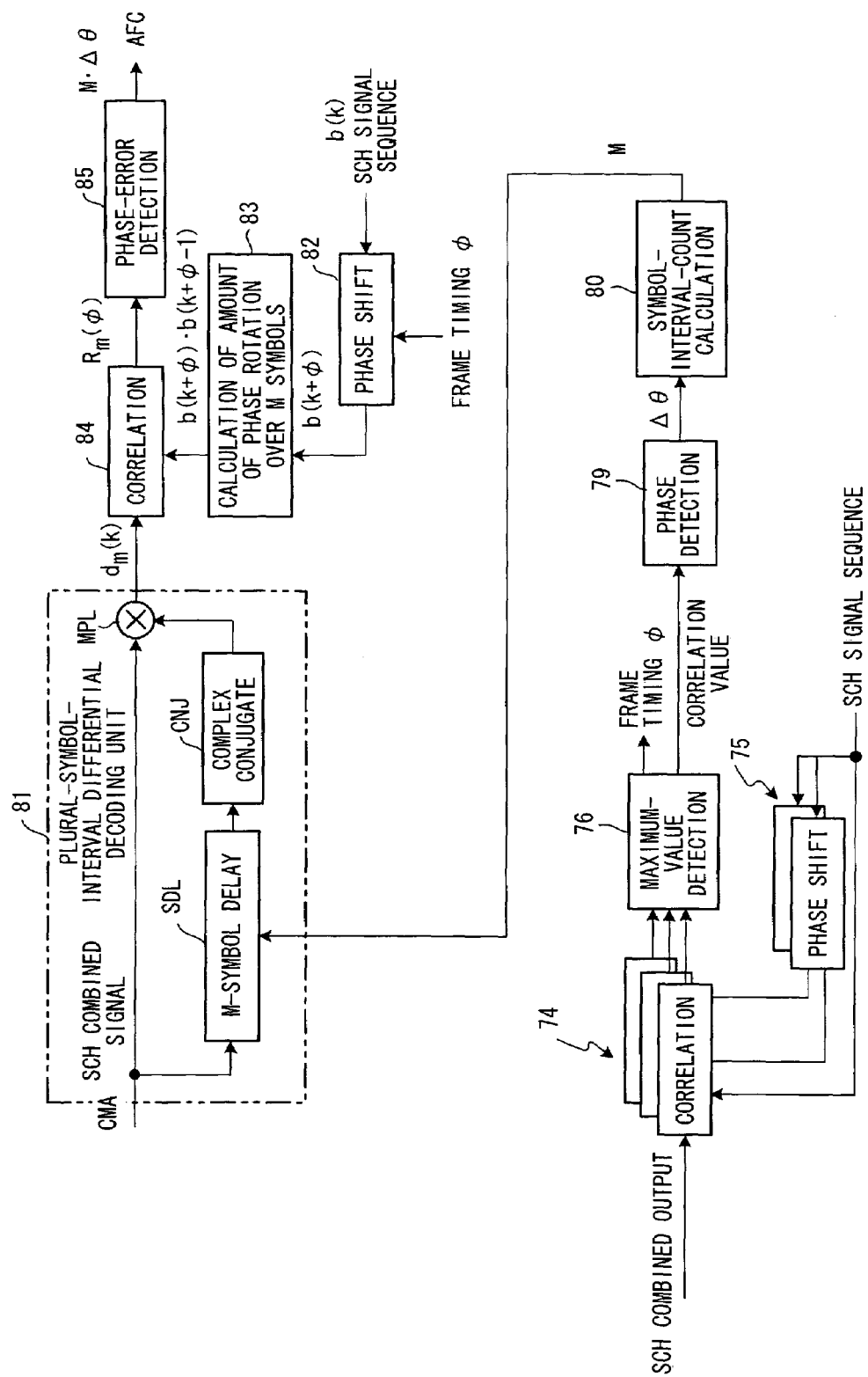
FIG. 6 is a block diagram of a high-precision phase-error estimating unit according to the present invention.

FIG. 6 is a block diagram of a high-precision phase-error estimating unit according to the present invention. This unit decides the symbol interval M of differential decoding in an initial stage and estimates high-precision phase error Δθ, which is used in a high-precision AFC scheme, in a latter stage. More specifically, in the initial stage, the correlator 74, phase shifter 75 and maximum-value detector 76 detect, as frame timing, the phase φ for which correlator output is maximized while shifting the phase of the SCH signal sequence, as described in conjunction with FIGS. 4, 5. A phase detector 79 calculates the correlation-value phase-shift amount $\Delta\theta=2\pi\Delta f_C TS_B$ in the above-mentioned frame timing in accordance with Equation (14), and a symbol-interval-count calculating unit 80 decides the number M of symbol intervals and inputs the number to a plural-symbol-interval differential decoding unit 81.

The plural-symbol-interval differential decoding unit 81, which has a symbol delay unit SDL for delaying, by M symbols, the CMA combined signal that is output from the CMA combiner 77 (see FIG. 5), a complex conjugate unit CNJ for calculating the complex conjugate of the output signal from the symbol delay unit SDL, and a multiplier for multiplying the receive SCH signal by the complex conjugate of the SCH signal of the preceding M symbols, performs the operation of Equation (16). A phase shifter 82 shifts the phase of the SCH signal sequence b(κ) by the amount of the frame timing φ already found and outputs b(κ+φ). A calculation unit 83 for calculating amount of phase rotation over M symbols multiplies M symbol's worth of SCH signal sequences b(k+φ), b(k+φ−1), . . . , b(k+φ−(M−1)) that enter from the phase shifter 82 and outputs the result of multiplication. If M=2 holds, the calculation unit 83 outputs b(k+φ)·b(k+φ−1). A correlator 84 performs the operation of Equation (17) and outputs the correlation value $R_m(\phi)$, and a phase-error detector 85 calculates a phase error (amount of phase shift) that has been multiplied by M, namely M·Δθ, according to the following equation:

$$M\Delta\theta = \tan^{-1}\frac{\mathrm{Im}(R_m(\phi))}{\mathrm{Re}(R_m(\phi))} \quad (18)$$

and inputs this to an AFC controller, which is not shown. The AFC controller controls the oscillation frequency of the local oscillator based upon the polarity of the phase error, as will be described later, and exercises control so as to null the offset frequency, i.e., in such a manner that oscillation frequencies on the transmitting and receiving sides become equal.

In the control described above, the number M of symbol intervals in the differential decoding unit need not be fixed during the cell search. As AFC is pulled in, the carrier offset frequency declines and so does the amount Δθ of phase shift. Since the amount of phase shift is obtained frame by frame, the phase M·Δθ of $R_m(\phi)=|h_m|^2\exp(j2\pi\Delta f_C T_{SB}M)$ is found according to Equation (18), the amount Δθ of phase shift is calculated according to the following equation:

$$\Delta\theta = \tan^{-1}\frac{\mathrm{Im}(R_m(\phi))}{\mathrm{Re}(R_m(\phi))}\frac{1}{M} \quad (19)$$

and the parameter M that is optimum for estimation of amount of phase shift of the next frame is decided by the following equation:

$$M = \frac{\pi}{2|\Delta\theta|} \quad (20)$$

Figure 7:
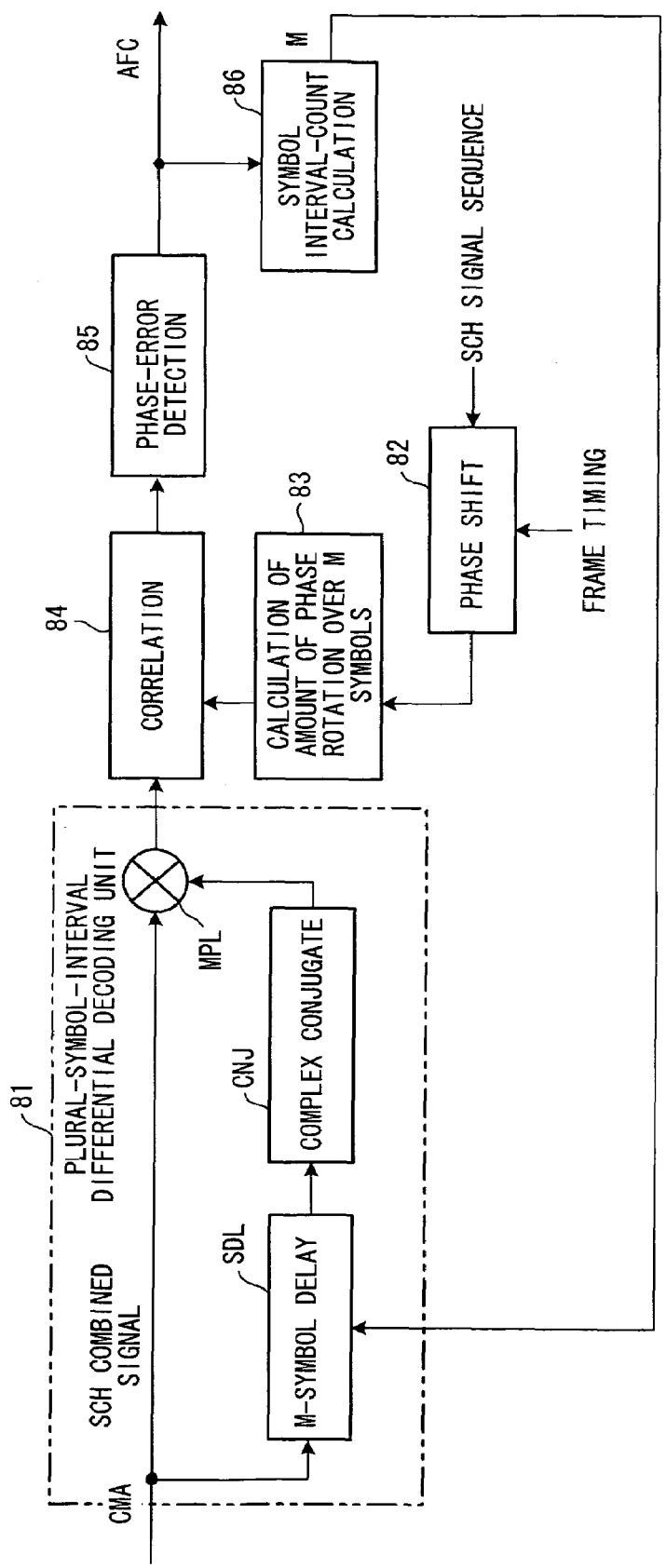
FIG. 7 is a block diagram of a high-precision phase-error estimating unit capable of varying a symbol interval of differential decoding.

FIG. 7 is a block diagram of such a high-precision phase-error estimating unit. Components identical with those in FIG. 6 are designated by like reference characters. A symbol interval calculation unit 86 performs the operations of Equations (19), (20) and calculates the number M of symbol intervals in differential decoding of the next frame and sets M in the plural-symbol-interval differential decoding unit 81. As a result, the plural-symbol-interval differential decoding unit 81 performs differential decoding at the set symbol intervals.

(E) Correction of Residual Frequency Error

According to the present invention, the phase-shift amount $M \cdot \Delta\theta$ ascribable to carrier frequency offset can be estimated. This makes it possible to multiply the estimated phase-shift amount by 1/M to thereby calculate the amount $\Delta\theta$ of phase rotation per symbol block, and to rotate each receive subcarrier signal in the reverse direction by this amount of phase rotation, thereby correcting for the residual frequency error.

In AFC, the carrier frequency offset is corrected. However, the time constant of AFC control is very long and the amount of updating of carrier frequency in the local oscillator (VCO) is very small. As a result, AFC and correction of residual frequency error of the subcarrier signals will not impede each other. Accordingly, both AFC and correction of residual frequency error of the subcarrier signals can be performed using the amount of phase shift.

Figure 8:
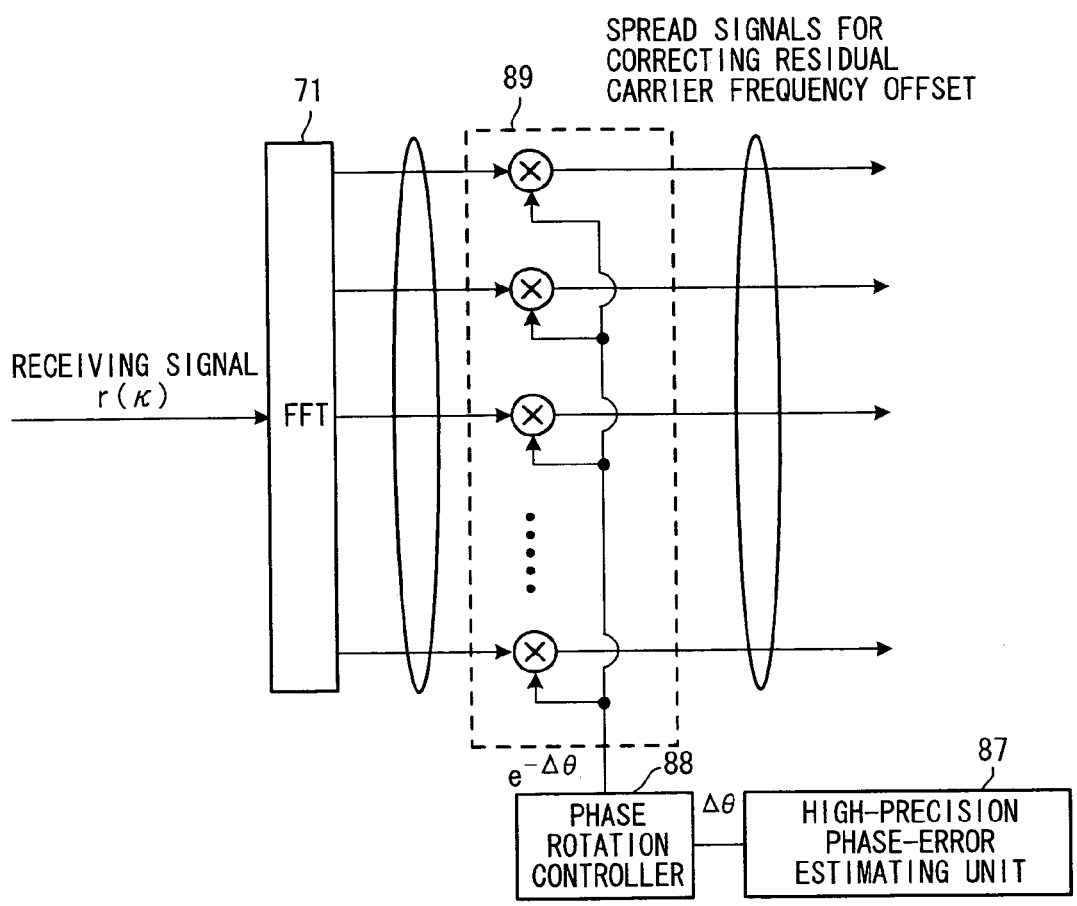
FIG. 8 is a diagram illustrating the structure of the present invention for correcting residual carrier frequency offset using amount of phase shift.

FIG. 8 is a diagram illustrating the structure of the present invention for correcting residual carrier frequency offset using amount of phase shift. A high-precision phase-error estimating unit 87 shown in FIG. 6 or 7 calculates the phase error $\Delta\theta$ according to Equation (19), a phase rotation controller 88 calculates $\exp(-\Delta\theta)$, and each multiplier of a phase rotator 89 multiplies a respective subcarrier signal, which is output from the FFT calculation unit 71, by $\exp(-\Delta\theta)$, thereby rotating the subcarrier signal by $-\Delta\theta$ in the reverse direction to correct for residual frequency error.

(G) Two-dimensional Spreading

Figure 9:
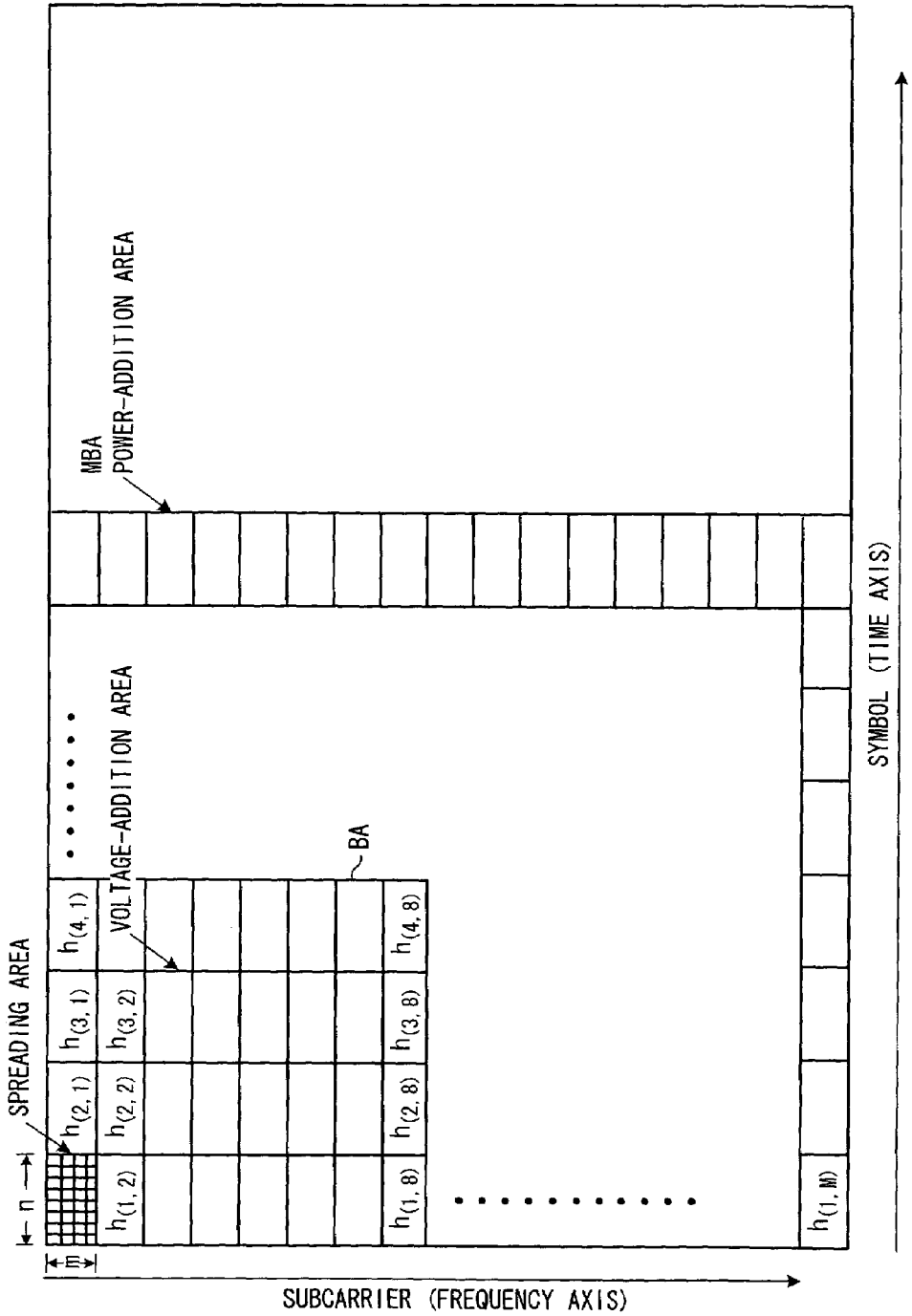
FIG. 9 is a diagram for describing a case where a dedicated physical channel and a common pilot channel have each been spread in a two-dimensional area of time and frequency using spreading code.

Conventionally, transmit data is spread in the frequency direction, i.e., in a one-dimensional area. However, with spreading in a one-dimensional area, which is frequency or time, orthogonality tends to suffer owing to frequency selectivity or time variability of the channel. Accordingly, as shown in FIG. 9, spreading and multiplexing are performed using spreading code in two-dimensional areas of time and frequency (m×n areas of m in the frequency direction and n in the time direction) in such a manner that the spreading areas of the dedicated physical channel DPCH and common pilot channel CPICH will affected by channel fluctuation as little as possible, and masking is performed by CSSC (Cell-Specific Scramble code). When spreading is performed to a two-dimensional areas, the number of subcarriers in the frequency area can be reduced in comparison with one-dimensional spreading at the same spreading gain. This makes it possible to maintain orthogonality.

Figure 10:
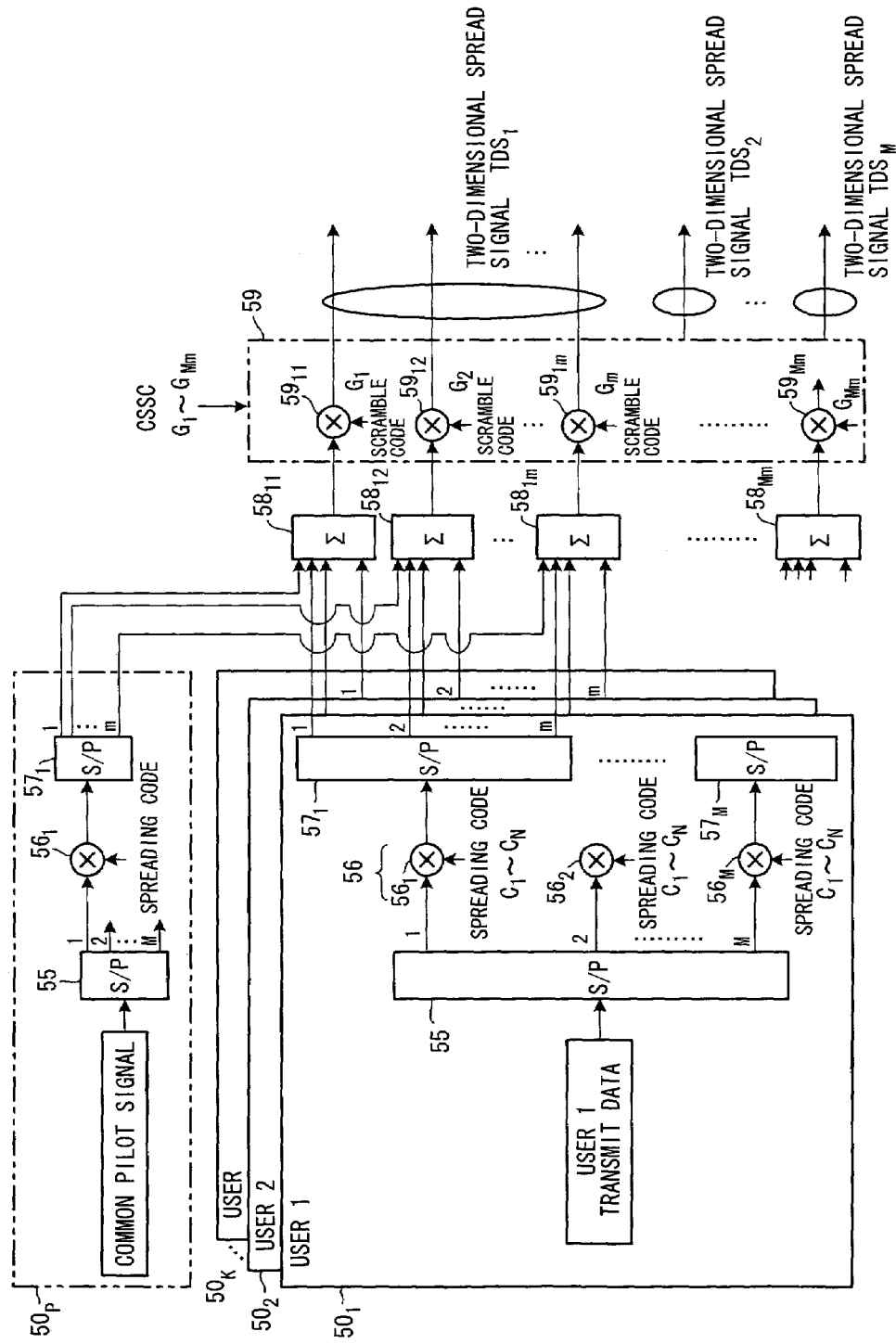
FIG. 10 is a first block diagram showing the principal components on the transmitting side of a base station having a two-dimensional spreading unit according to the present invention.
Figure 11:
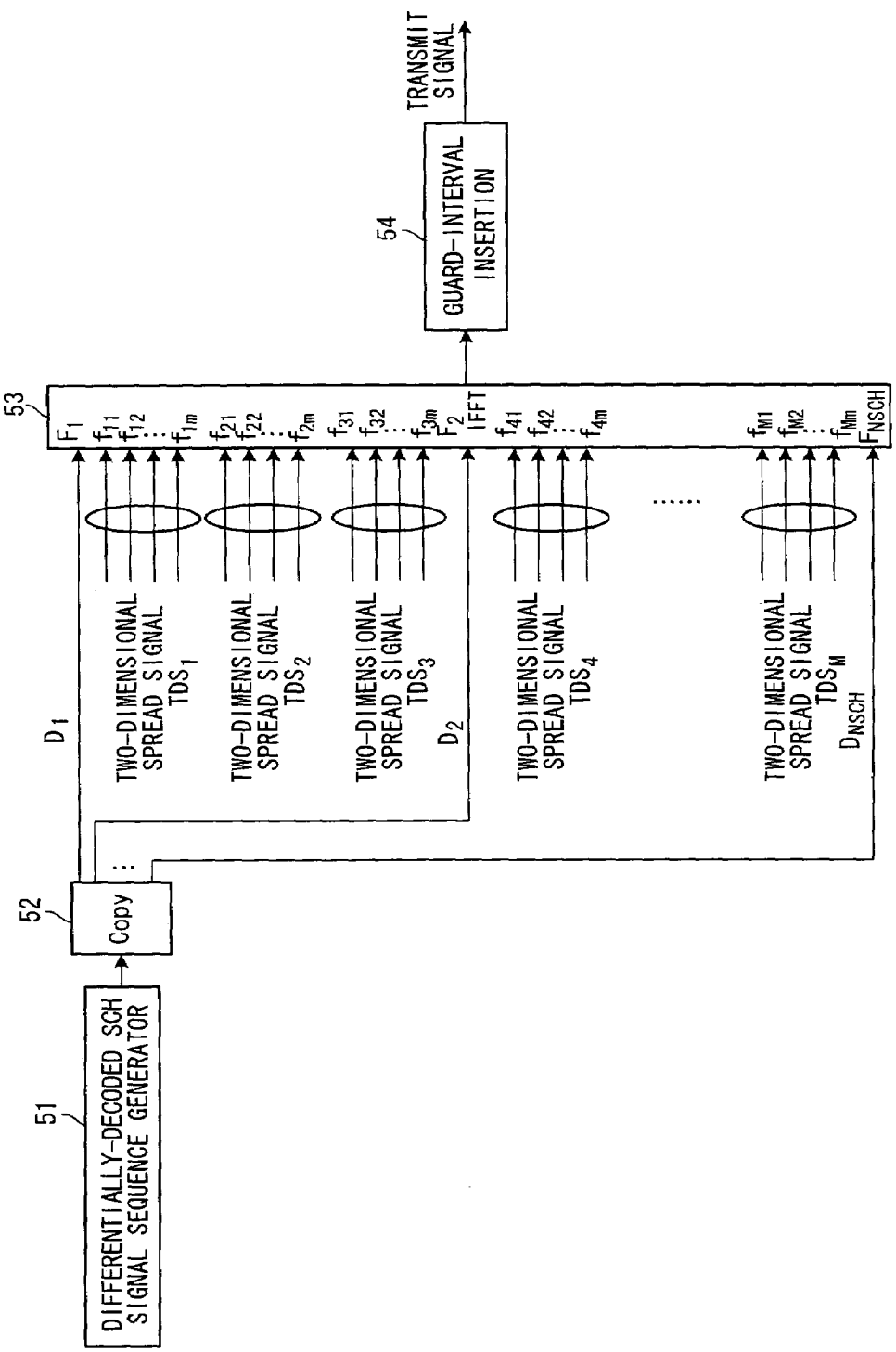
FIG. 11 is a second block diagram showing the principal components on the transmitting side of a base station having a two-dimensional spreading unit according to the present invention.

FIGS. 10 and 11 are block diagrams showing the transmitting side of a base station having a two-dimensional spreading unit according to the present invention. In FIG. 10, CPICH and DPCH are spread and multiplexed in two-dimensional areas of time and frequency using spreading code, and the multiplexed data is multiplied by CSSC of base station. In FIG. 11, IFFT (Inverse Fast-Fourier Transform) processing is applied to two-dimensional spread signals, which are subcarrier signals, and to the signal of the synchronization channel SCH, thereby effecting a transformation to an OFDM symbol signal on the time axis, a guard interval is appended and the resultant signal is output.

Figure 12:
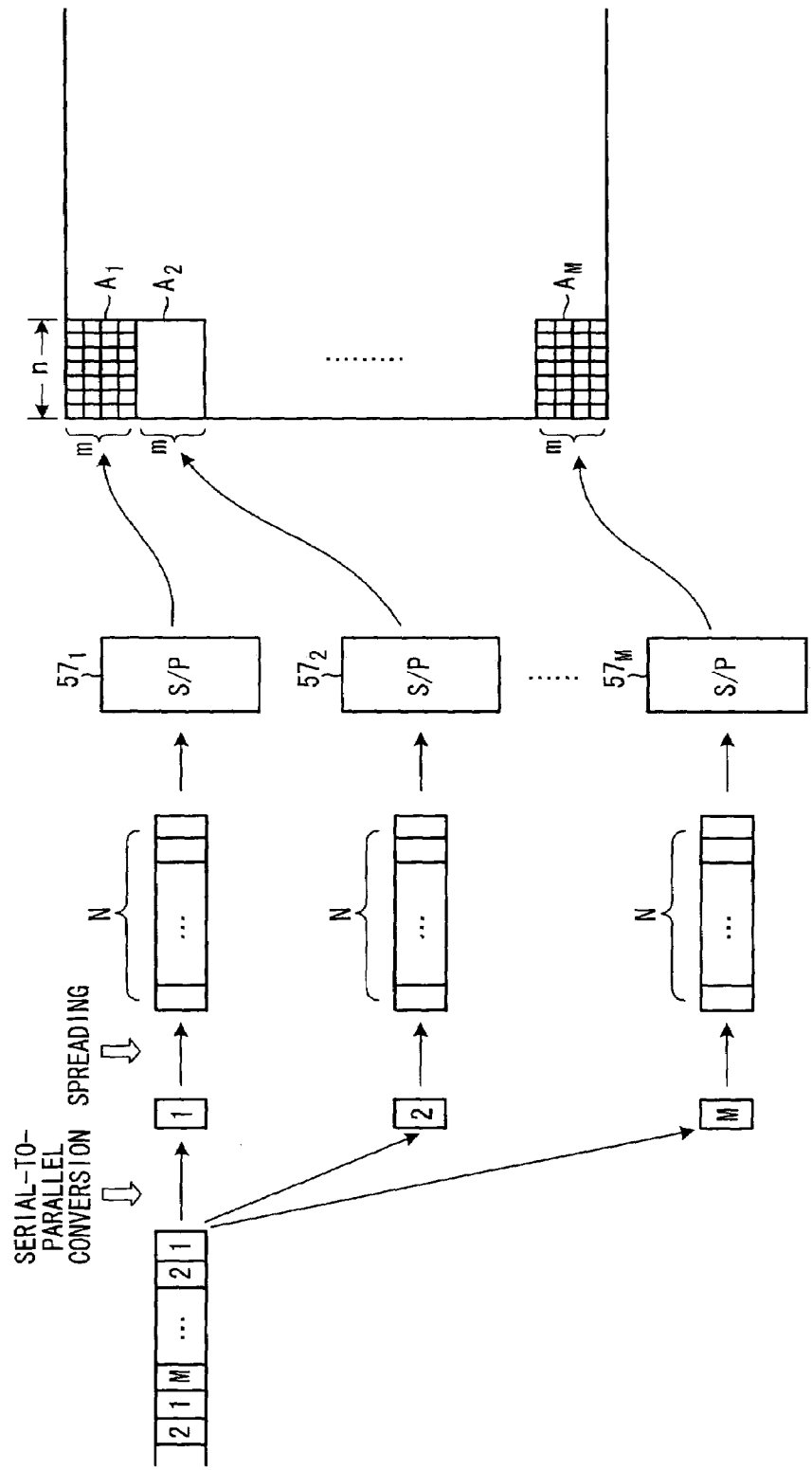
FIG. 12 is a diagram for describing a case where two-dimensional spreading is achieved by converting N items of serial data to n sets of parallel data m at a time (N=m×n)

In FIG. 10, a serial/parallel converter 55 in a two-dimensional spreader $50_1$ of a first user converts the transmit signal of the first user to M-number of items of parallel data. M-number of multipliers $56_1$ to $56_M$ of a spreader 56 multiply each item of parallel data by channelization codes (Walsh codes) $C_1$ to $C_N$ of the first user to thereby perform spreading, and serial/parallel converters $57_1$ to $57_M$ convert N-number of items of serial data, which enter from the corresponding multipliers $56_1$ to $56_M$, to n sets of parallel data m at a time (N=m×n) and output the data sequentially. As a result, first user data is spread to M-number of two-dimensional areas (m×n areas of m in the frequency direction and n in the time direction) $A_1$ to $A_M$, as illustrated in FIG. 12. Similarly, two-dimensional spreaders $50_2$ to $50_K$ for other users and a two-dimensional spreader $50_P$ for the pilot also spread the user data and pilot to two-dimensional areas.

An adder $58_{11}$ adds the first data among the first to mth items of data that are output from the serial/parallel converter $57_1$ of each of the two-dimensional spreaders $50_1$ to $50_K$ and $50_P$. Similarly, an adder $58_{12}$ adds the second data among the first to mth items of data that are output from the serial/parallel converter $57_1$ of each of the two-dimensional spreaders $50_1$ to $50_K$ and $50_P$. Similarly, an adder $58_{1m}$ adds the mth data among the first to mth items of data that are output from the serial/parallel converter $57_1$ of each of the two-dimensional spreaders $50_1$ to $50_K$ and $50_P$.

Multipliers $59_{11}$ to $59_{Mm}$ of a masking unit 59 multiply the output signals of the adders $58_{11}$ to $58_{Mn}$ by the codes of the cell-identifying scramble codes CSSC ($G_1$ to $G_{Mm}$) and output the results. Multipliers $59_{11}$ to $59_{1m}$ first output an initial set of m-number subcarrier signals, then output a second set of m-number of subcarriers, and thenceforth similarly output an nth set of subcarrier signals, thereby outputting a total of m×n two-dimensional spread signals $TDS_1$. Similarly, multipliers $59_{21}$ to $59_2$m (not shown) first output an initial set of m-number subcarrier signals, then output a second set of m-number of subcarriers, and thenceforth similarly output an nth set of subcarrier signals, thereby outputting a total of m×n two-dimensional spread signals $TDS_2$. Thenceforth, in similar fashion, multipliers $59_{M1}$ to $59_{Mn}$ (not shown) first output an initial set of m-number subcarrier signals, then output a second set of m-number of subcarriers, and thenceforth similarly output an nth set of subcarrier signals, thereby outputting a total of m×n two-dimensional spread signals $TDS_M$. These two-dimensional spread signals $TDS_1$ to $TDS_M$ are input to the IFFT unit 53 (FIG. 11).

In FIG. 11, the differentially-encoded SCH signal sequence generator 51 generates an SCH signal sequence of one frame and Ns symbols, and the copying unit 52 generates $N_{SCH}$-number of copy symbols $D_1$ to $D_{NSCH}$ from the SCH signal of one symbol and inputs the copy symbols $D_1$ to $D_{NSCH}$ to the IFFT unit 53 as the signals of subcarriers $F_1$ to $F_{NSCH}$ exclusively for SCH. Further, the two-dimensional spread signals $TDS_1$ to $TDS_M$ generated by the masking unit 59 (FIG. 10) are input to the IFFT unit 53 as the signals of subcarrier $f_{11}$ to $f_{Mm}$ other than the exclusive subcarriers $F_1$ to $F_{NSCH}$.

The IFFT unit 53 applies IFFT (Inverse Fast-Fourier Transform) processing to the subcarriers signals, which are input in parallel, and converts these signals to an OFDM symbol signal on the time axis. The guard-interval insertion unit 54 inserts a guard interval into the OFDM symbol signal, and a transmitting unit (not shown) applies orthogonal modulation to the OFDM signal into which the guard interval has been inserted, up-converts the signal to a radio frequency, applies high-frequency amplification and transmits the resulting signal from an antenna.

(I) Channel Estimation and CSSC Identification

In a case where two-dimensional spreading has been performed in the manner shown in FIG. 9, the receiving side multiplies the subcarrier signals, which have been obtained by the FFT operation, by the complex conjugates of the pilot and CSSC candidates and sums the products, i.e., performs a correlation operation, whereby it can estimate channel response in the two-dimensional spreading areas. In this case, the spreading areas and the channel estimation areas agree. As a result, interference from the DPCH can be reduced and it is possible to improve channel estimation precision. It should be noted that one channel estimation value $h(\kappa,n)$ (where $\kappa$ and n represent a symbol index and subcarrier index, respectively) is obtained in each two-dimensional spreading area.

Figure 13:
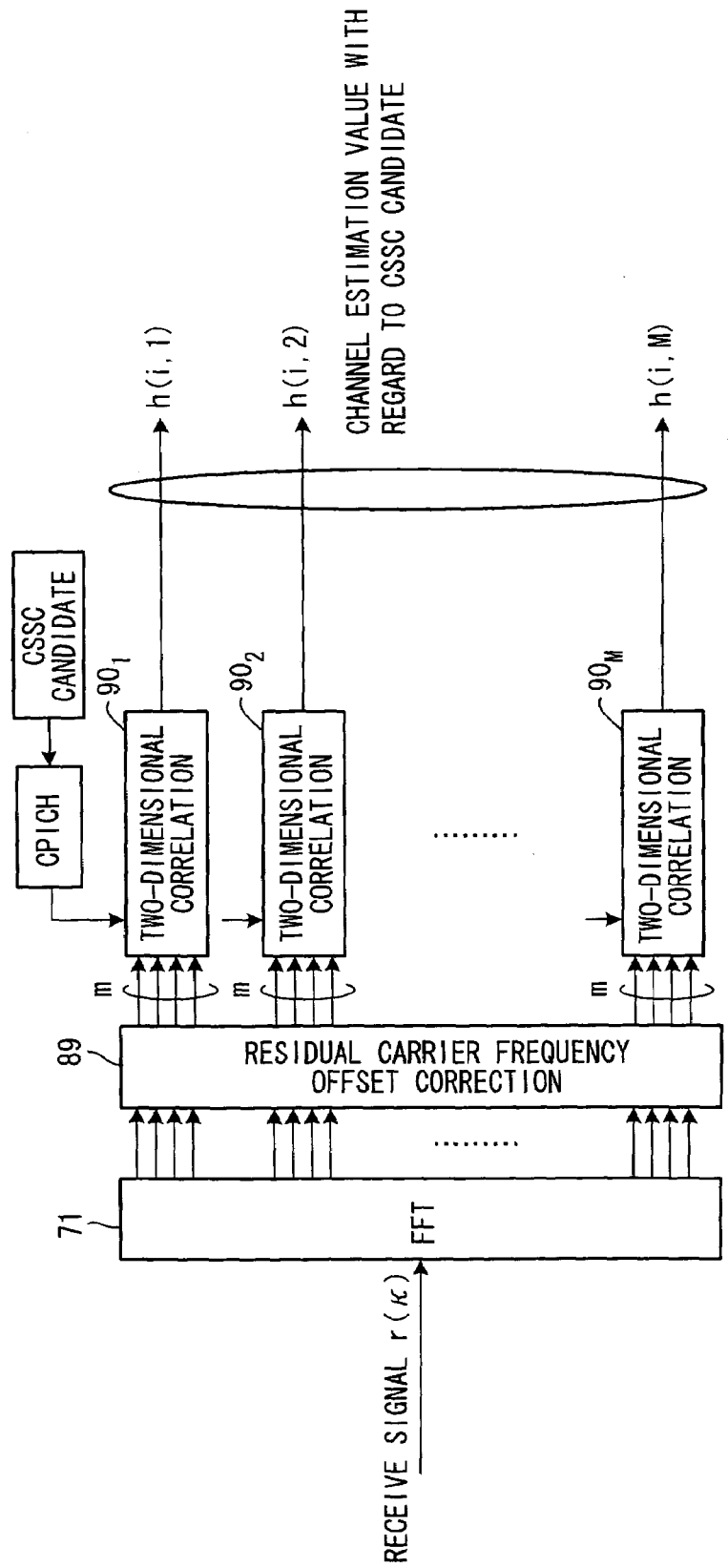
FIG. 13 is a block diagram of a channel-response estimating unit regarding CSSC candidates.

FIG. 13 is a block diagram of a channel-response estimating unit regarding CSSC candidates. Reference numeral 71 denotes the FFT calculation unit, 89 the phase rotator (residual carrier frequency offset correction unit) described in FIG. 8, and $90_1$ to $90_M$ two-dimensional correlating calculation units. When multiplexed data of CPICH and DPCH that have been spread to each of two-dimensional areas (m×n two-dimensional areas) of frequency and time is multiplied by the complex conjugates of the pilot (CPICH) and CSSC candidates and the products are summed, the channel-response estimation values in the two-dimensional spreading areas are obtained. Accordingly, the two-dimensional correlating calculation units $90_1$ to $90_M$ perform the above-mentioned summing of products and calculate the channel-response estimation values h(i,1) to h(i,M) of CSSC candidates in the two-dimensional spreading areas.

Figure 14:
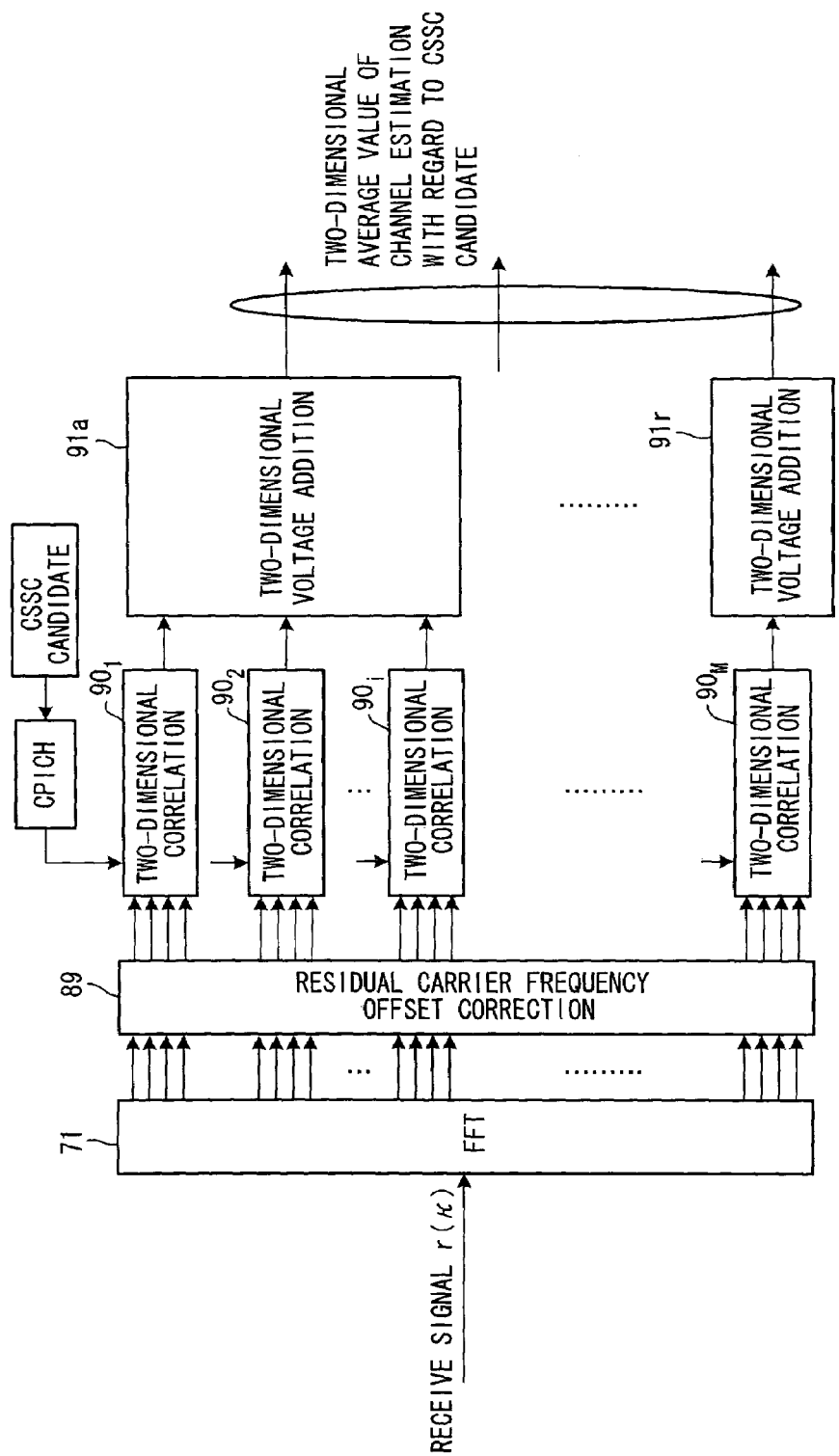
FIG. 14 is a block diagram in which correlation values are voltage-added and averaged.

Next, correlation values are voltage-added and averaged in order to enlarge the difference between correlation values obtained in each of the spreading areas with respect to the CSSC of the cell (base station) to be connected and correlation values obtained with respect to the CSSCs of other cells. In the present invention, averaging is performed in a two-dimensional area BA obtained by further enlarging the spreading area shown in FIG. 9. FIG. 14 is a block diagram in which correlation values are voltage-added and averaged. Components identical with those in FIG. 13 are designated by like reference characters. Arithmetic units 91a to 91r calculate and output voltage averages of correlation values within the enlarged two-dimensional area BA. In accordance with such an arrangement, average correlation values obtained in each of the spreading areas with respect to the CSSC of the cell to be connected are enlarged in comparison with the average correlation values of other CSSCs. This makes it possible to improve the CSSC identification capability.

Figure 15:
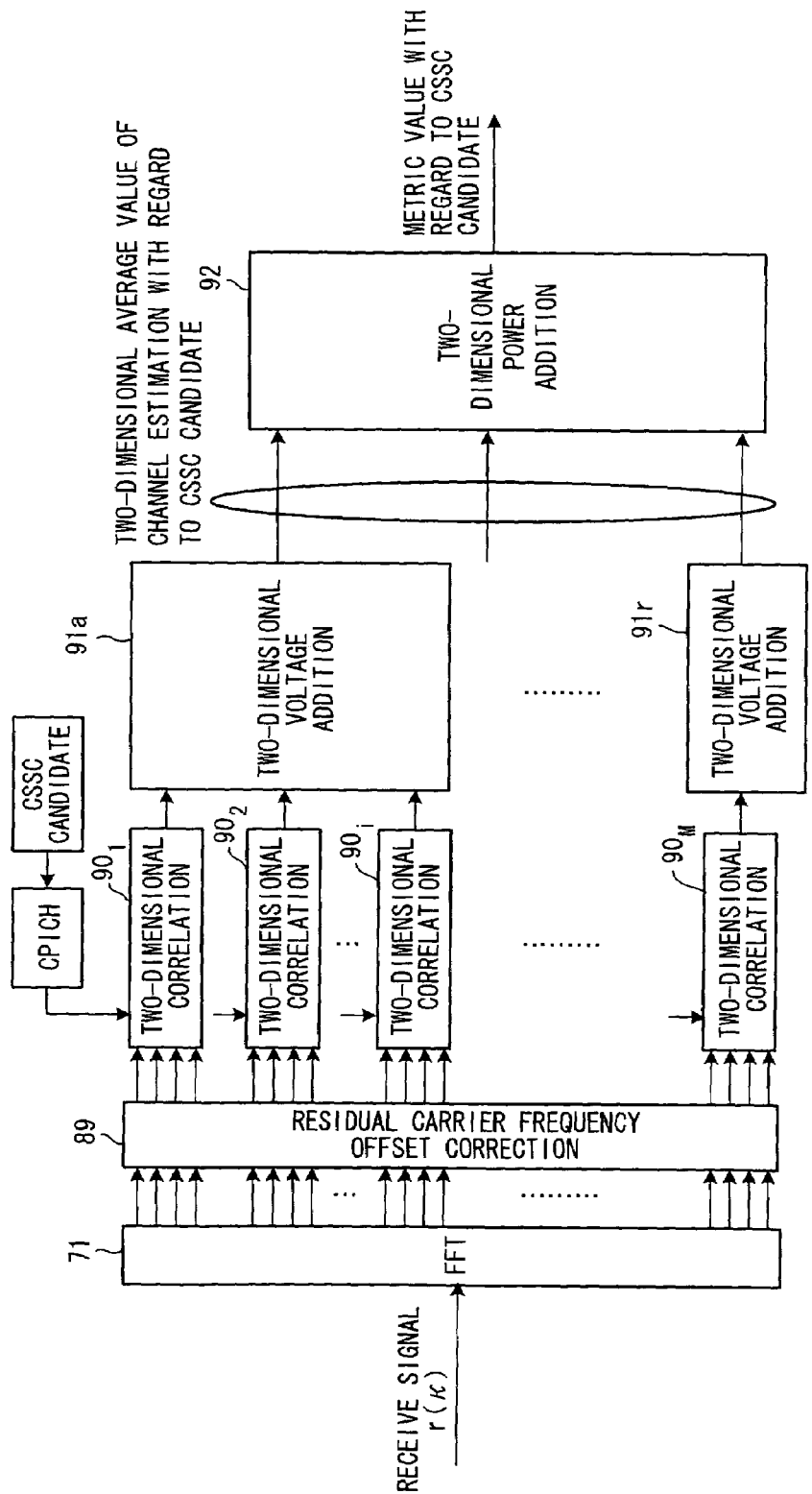
FIG. 15 is a block diagram in which power-addition of average correlation values is carried out.

Further, according to the present invention, it is so arranged that power addition of average correlation values is performed in a two-dimensional area MBA that is a further enlargement over the two-dimensional area BA. FIG. 15 is a block diagram in which power-addition of average correlation values is carried out. Components identical with those in FIG. 14 are designated by like reference characters. A two-dimensional power adder 92 calculates and adds the powers of two-dimensional voltage averages, within the two-dimensional area BA, calculated by the arithmetic units 91a to 91r. If this arrangement is adopted, the difference between a metric with respect to the CSSC of the cell to be connected and a metric with respect to the CSSC of another cell becomes larger and it is possible to improve the CSSC identification capability. That is, the above-mentioned two-dimensional power-addition value is calculated for every CSSC candidate and the CSSC candidate for which the power-addition value is maximized is identified as the CSSC of the cell to be connected.

It should be noted that correlation values obtained by inputting the complex conjugates of the CSSC of the cell to be connected and of the pilot (CPICH) to the two-dimensional correlating calculation units $90_1$ to $90_M$ become channel-response estimation values in two-dimensional spreading areas. As a result, channel compensation can be carried out using these channel-response estimation values.

(J) Cell Search Procedure

Figure 16:
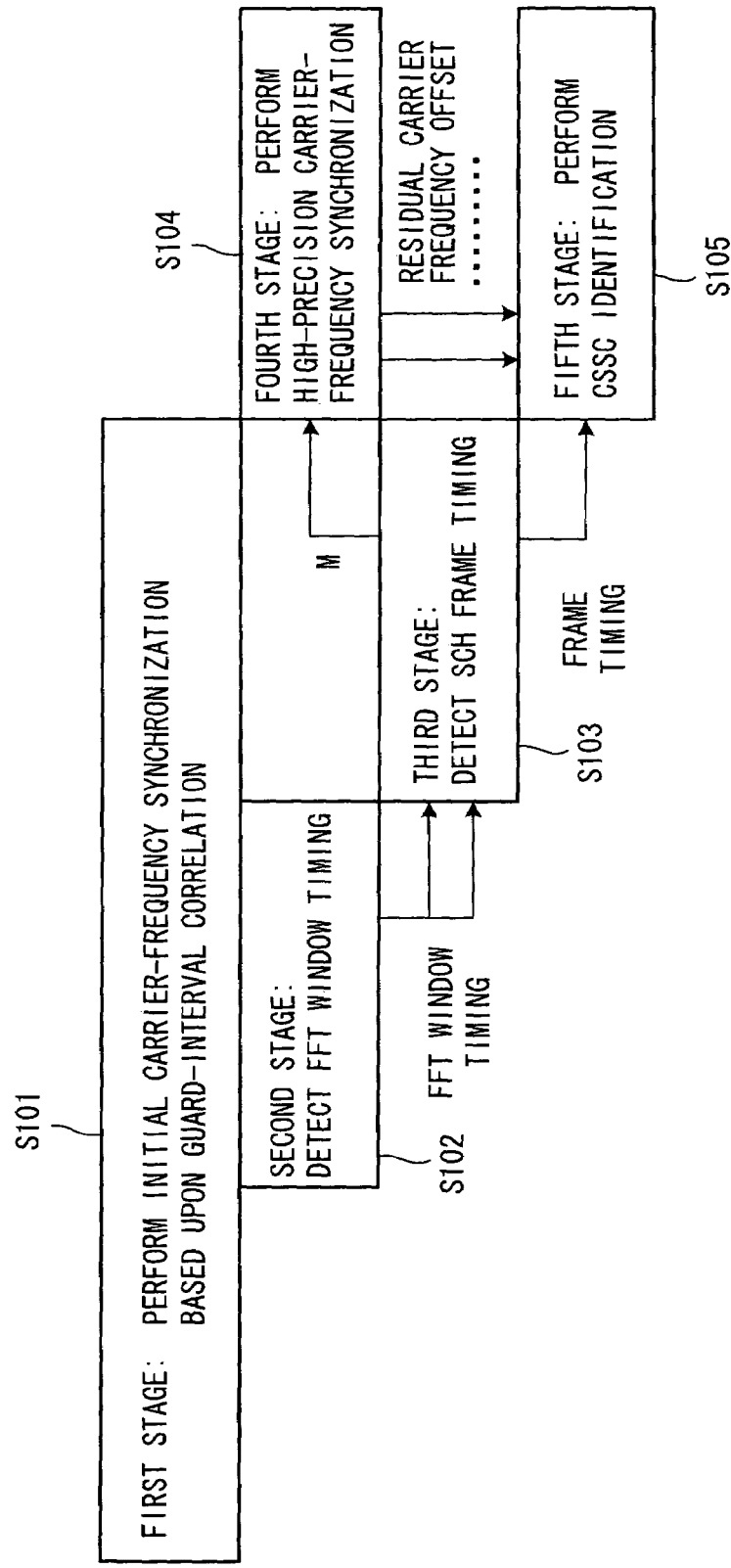
FIG. 16 is a diagram useful in describing the procedure of a cell search according to the present invention.

FIG. 16 illustrates the procedure of a cell search according to the present invention. First, in a first stage, carrier frequency synchronization based upon the conventional guard-interval correlation is performed and carrier frequency synchronization is performed coarsely (S101). However, in a case where carrier frequency offset is not that large in terms of the system, this first stage is not necessarily required. . . . S101

In a second stage, correlation peak is detected by guard-interval correlation and FFT window timing synchronization is achieved. If there is no synchronization between base stations at this time, the obtained correlation peak is masked on both sides, the timing at which the correlation power value is maximized is detected and a plurality of timing candidates are retained. In case of a system in which timing synchronization has been achieved between base stations, it will suffice to detect only one FFT window timing. . . . S102

In a third stage, the receive signal is converted to subcarrier signals by FFT in regard to each of FFT window timing candidates obtained in the second stage, subcarrier signals to which SCH has been assigned are differentially decoded and a correlation operation is performed. The SCH frame timing for which the correlation power is maximized is detected taking all FFT timing candidates into account. . . . S103

In a fourth stage, differential decoding is performed over a plurality of symbol intervals based upon the SCH frame timing obtained, thereby detecting phase error in highly precise fashion, and carrier frequency synchronization is achieved (S104). In parallel with the fourth stage, identification of CSSC is performed while correcting the residual carrier frequency offset of the spread signal in a fifth stage (S105).

(K) Arrangements for Detecting FFT Window Timing and SCH FRAME TIMING

First Embodiment

Figure 17:
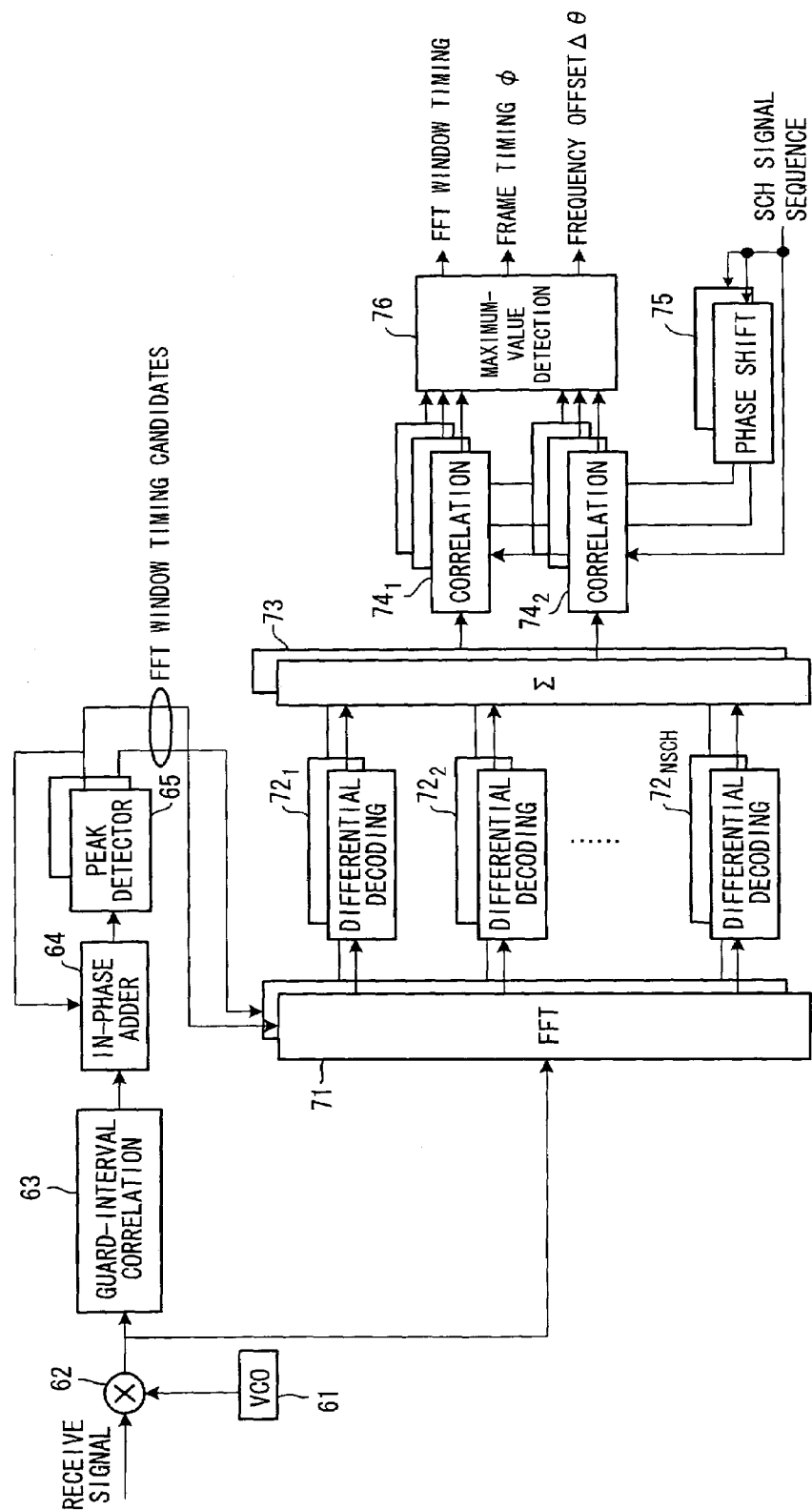
FIG. 17 illustrates an embodiment of the present invention relating to detection of FFT window timing and detection of SCH frame timing.

FIG. 17 illustrates an embodiment relating to detection of FFT window timing and detection of SCH frame timing. Receive signal frequency is converted to an intermediate frequency by a local oscillator (VCO) 61 and a mixer 62. A guard-interval correlation calculating unit 63 performs guard-interval correlation with respect to the receive signal, an in-phase adder 64 performs in-phase addition and averaging, and a peak detector 65 detects two or more peaks to thereby detect a plurality of FFT window timings. The above control for detecting FFT window timing candidates is the same as that of the prior art.

Next, frame timing and frequency offset (phase error) are decided by the control described in conjunction with FIG. 4. That is, the receive signal is converted to subcarrier signals by the FFT calculation unit 71 at the FFT window timing of each candidate, the differential decoders $72_1$ to $72_{N_{SCH}}$ differentially decode the subcarrier signals to which SCH has been assigned, and the adder 73 combines the differentially decoded results and outputs the SCH combined signal. With regard to each of the FFT window timing candidates, correlators $74_1$, $74_2$ calculate correlation between the SCH combined signal and SCH signal sequence that prevailed prior to differential encoding, and the maximum-value detector 76 ① detects the SCH frame timing φ for which the correlation power value is maximized, ② detects the FFT window timing that prevailed when the SCH frame timing was detected, and ③ detects the phase error (carrier frequency offset) Δθ from the correlation value for which the SCH frame timing has been detected. Further, the maximum-value detector 76 also decides the number M of symbol intervals in the differential decoding of a plurality of symbol intervals used in highly precise control of carrier frequency synchronization.

Second Embodiment

Figure 18:
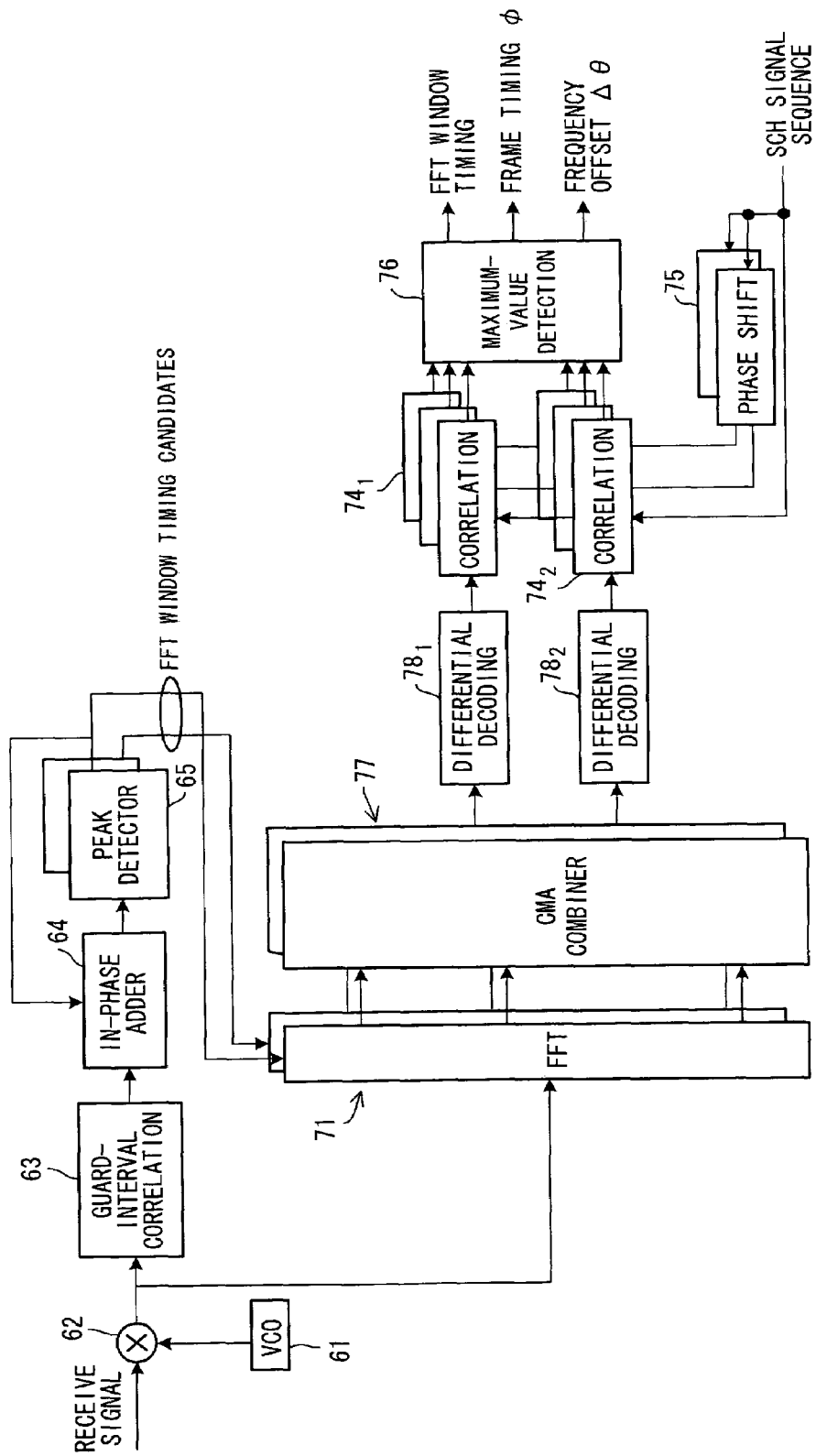
FIG. 18 illustrates a second embodiment of the present invention relating to detection of FFT window timing and detection of SCH frame timing.

FIG. 18 illustrates a second embodiment relating to detection of FFT window timing and detection of SCH frame timing. FFT window candidates are decided by control similar to that of FIG. 17. Next, frame timing and frequency offset (phase error) Δθ are decided by control described on conjunction with FIG. 5. That is, the FFT calculation unit 71 converts the receive signal to subcarrier signals at the FFT window timing of each candidate. The CMA combiner 77 weights and combines the subcarrier signals to which SCH has been assigned and updates the weighting coefficients using the CMA algorithm. If the weighting coefficients converge, the CMA combiner 77 outputs only the SCH combined signal from the base station for which the reception power is largest. Differential decoders $78_1$, $78_2$ execute differential decoding with respect to the CMA combined signal of each FFT timing candidate, and correlators $74_1$, $74_2$ calculate the correlation between the results of differential decoding and the SCH signal sequence that prevailed prior to differential encoding. The maximum-value detector 76 ① detects the SCH frame timing φ for which the correlation power value is maximized, ② detects the FFT window timing that prevailed when the SCH frame timing was detected, and ③ detects the phase error (carrier frequency offset) Δθ from the correlation value for which the SCH frame timing has been detected. Further, the maximum-value detector 76 also decides the number M of symbol intervals in the differential decoding of a plurality of symbol intervals used in highly precise control of carrier frequency synchronization.

(L) AFC Control

First Embodiment

Figure 19:
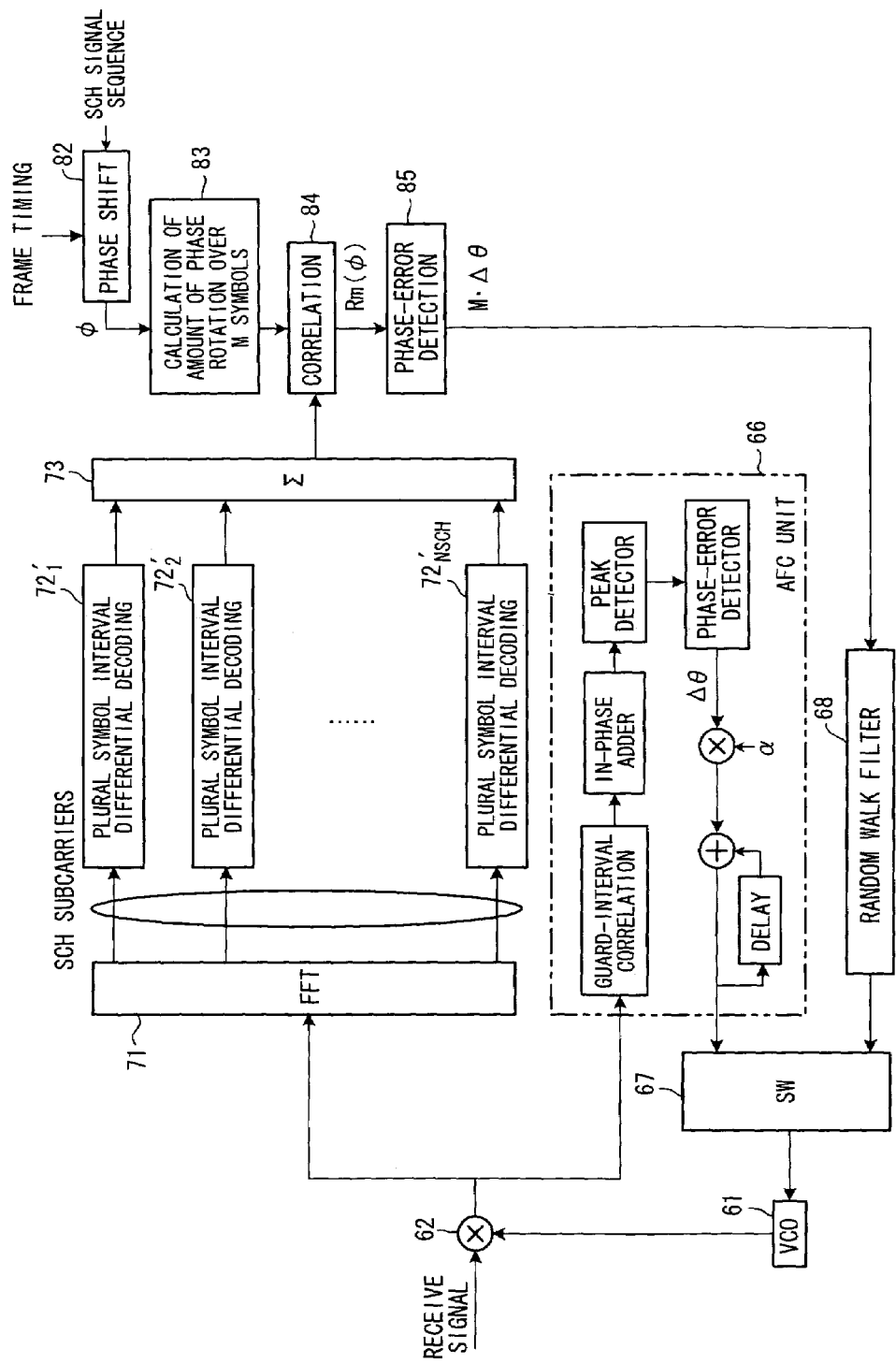
FIG. 19 is a block diagram of a first embodiment of AFC control.
Figure 33:
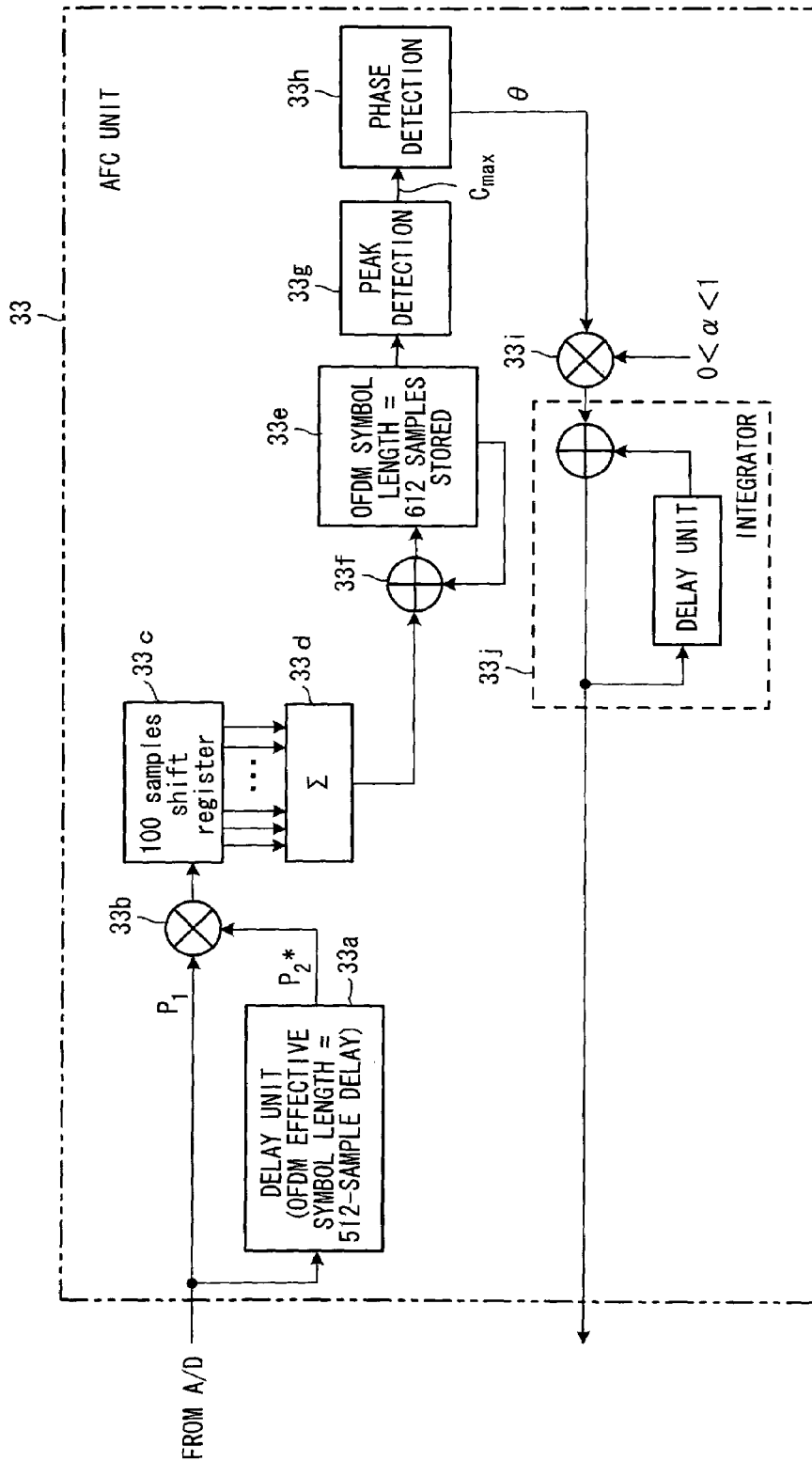
FIG. 33 is a block diagram of an AFC unit.
Figure 36:
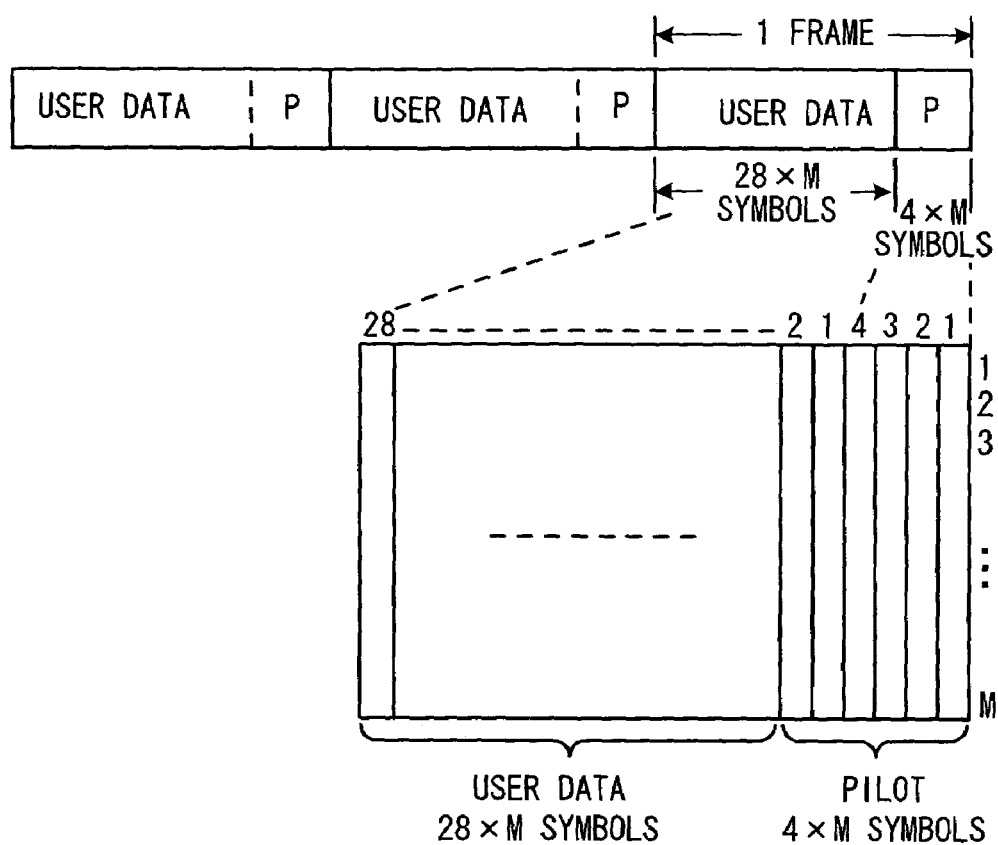
FIG. 36 is a diagram useful in describing frame structure in a time-division multiplexing scheme.
Figure 37:
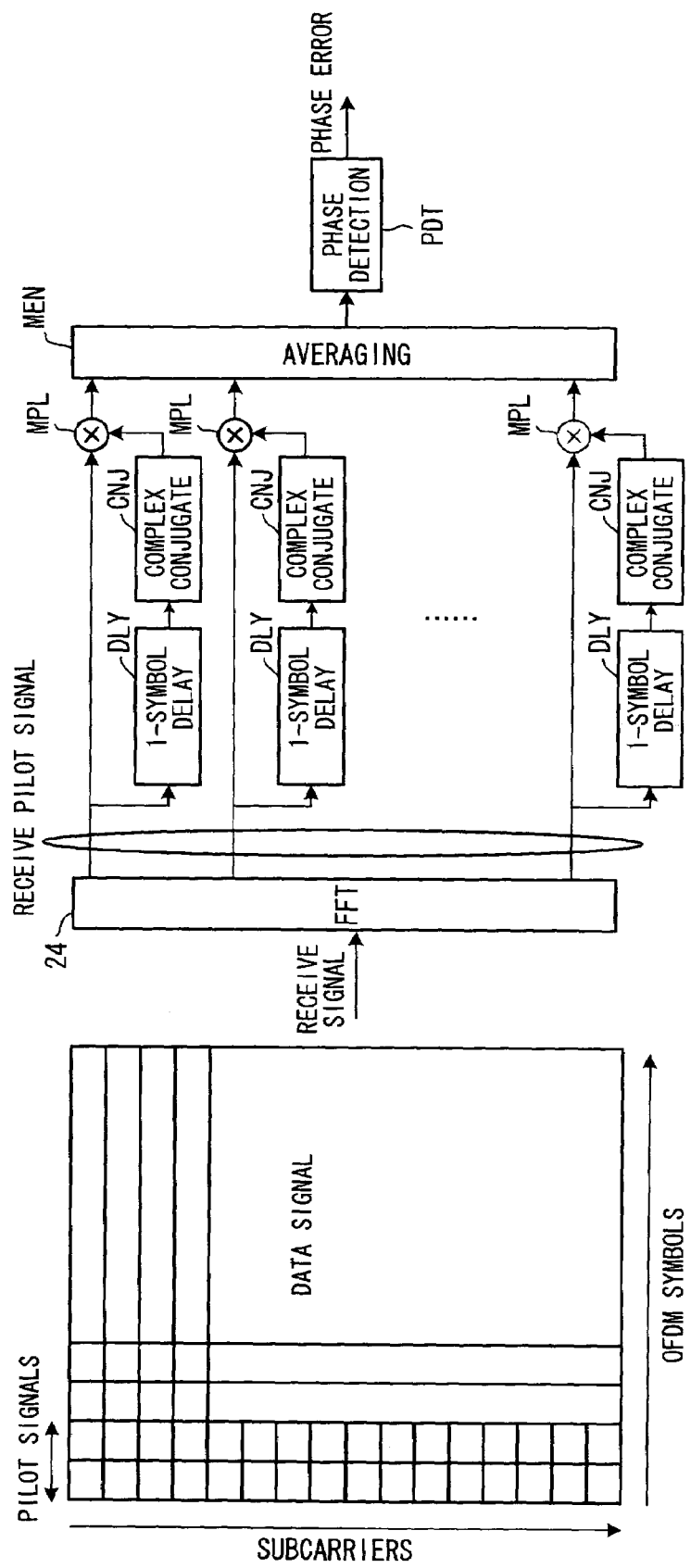
FIG. 37 illustrates an example of implementation of AFC control in time-division multiplexing.
Figure 38:
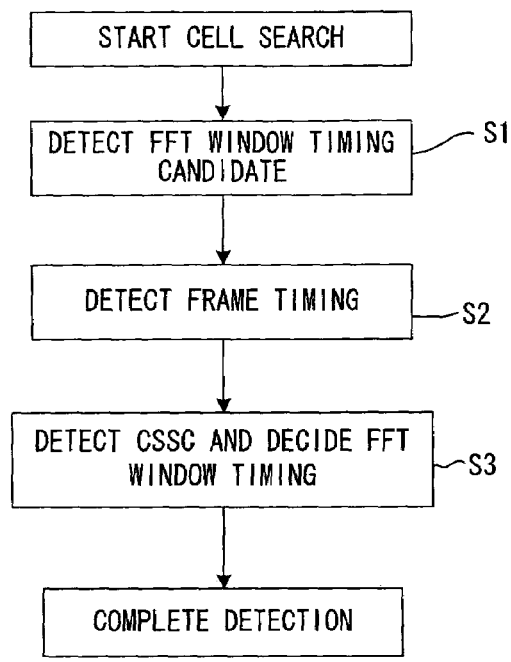
FIG. 38 is a diagram useful in describing a cell search.
Figure 39:
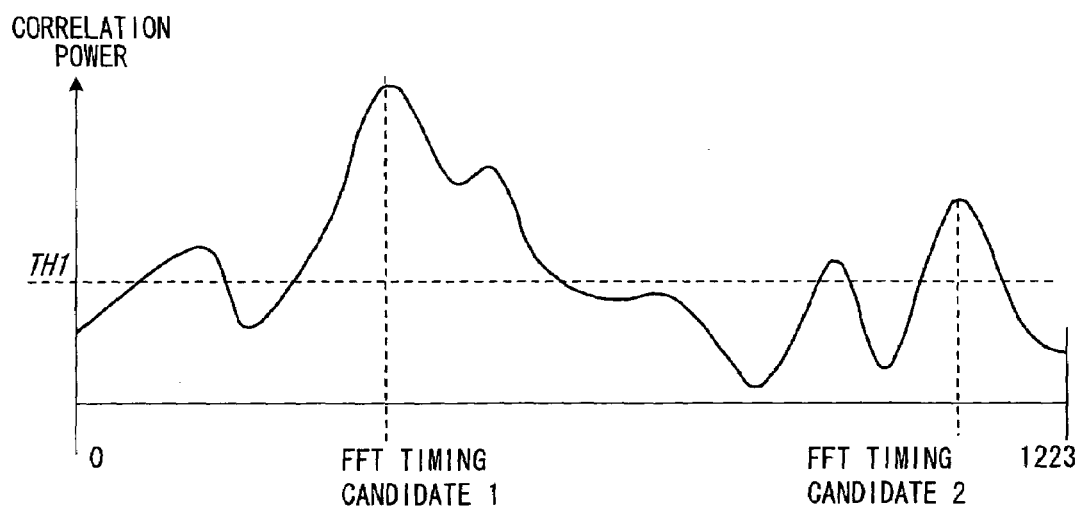
FIG. 39 is a diagram useful in describing peak values in guard-interval correlation.
Figure 40:
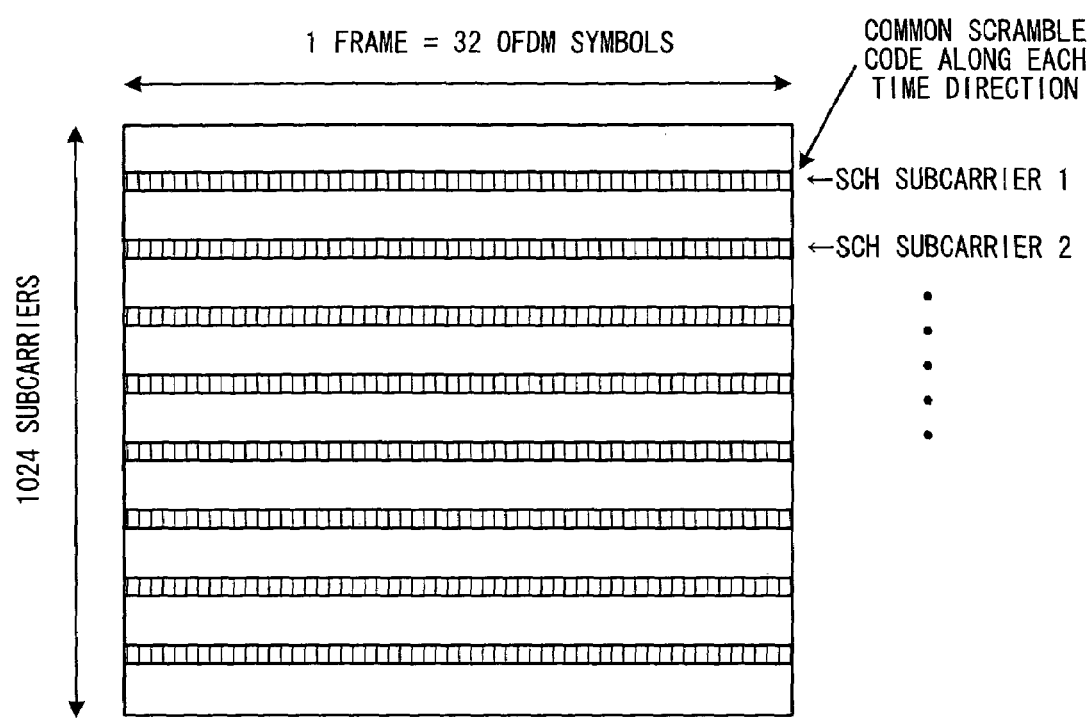
FIG. 40 illustrates SCH frame format.
Figure 41:
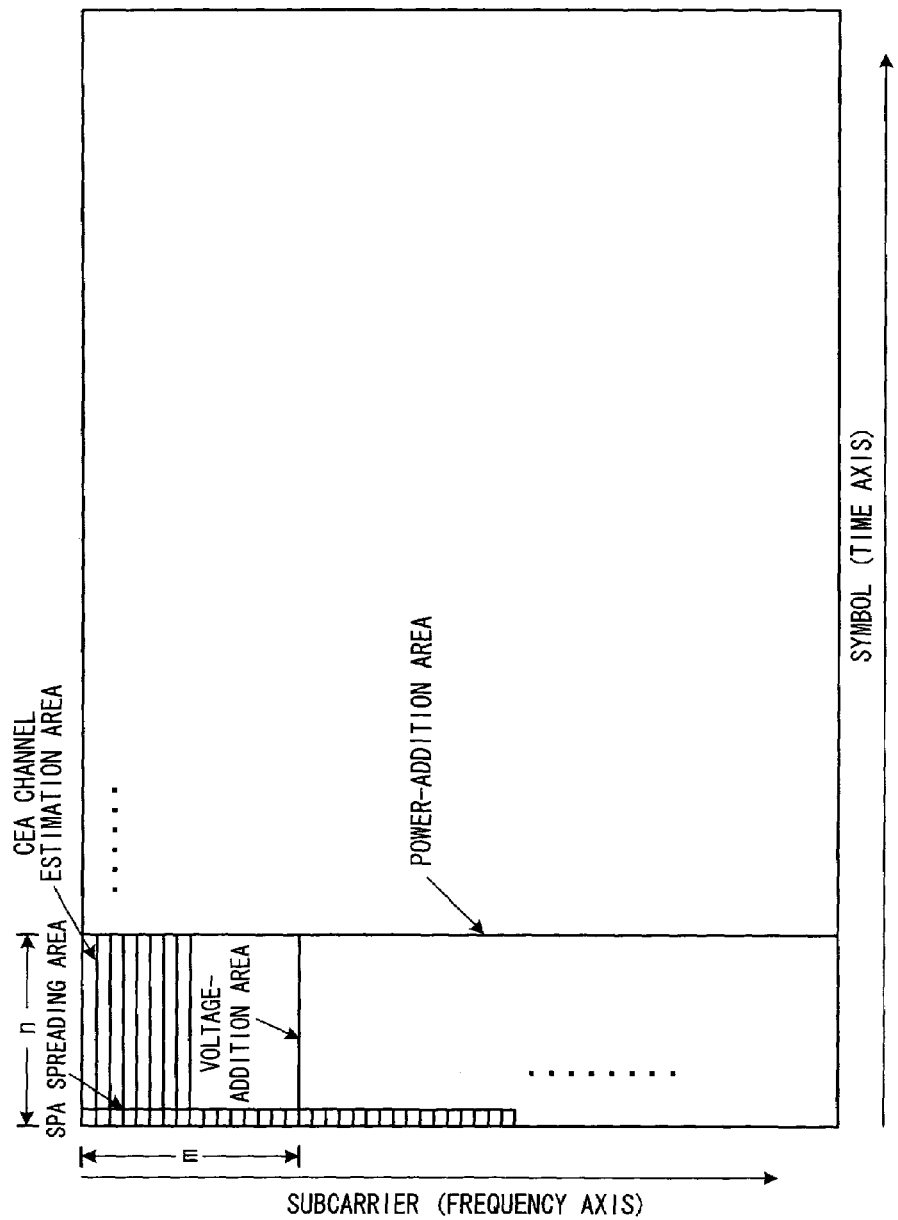
FIG. 41 is a diagram useful in describing a voltage-addition area and a power-addition area in processing for detecting SCH frame timing.

FIG. 19 is a block diagram of a first embodiment of AFC control. In a first stage, an AFC unit 66, in a manner similar to that of the example of the prior art (see FIGS. 33 to 35), performs peak detection based upon guard-interval correlation, detects phase error of the correlation value at the peak timing and controls the oscillation frequency of a VCO-implemented local oscillator 61 via a switch 67 so as to reduce the phase error.

Next, SCH frame timing, FFT window timing and the symbol interval M of differential decoding are decided by the control of FIG. 17. The FFT calculation unit 71 thenceforth performs the FFT operation at this FFT window timing, and the differential decoders $72_1$ to $72_{NSCH}$ perform differential decoding over a plurality of symbol intervals with regard to subcarrier signals to which SCH has been assigned, namely the operation of Equation (16). The adder 73 combines the differentially decoded results and outputs the SCH combined signal.

On the other hand, the phase shifter 82 shifts the phase of the SCH signal sequence b(k) by the amount of the frame timing φ already found and outputs b(k+φ). The calculation unit 83 for calculating amount of phase rotation over M symbols multiplies M symbol's worth of SCH signal sequences b(k+φ), b(k+φ−1), . . . , b(k+φ−(M−1)) that enter from the phase shifter 82 and outputs the result of multiplication. If M=2 holds, the calculation unit 83 outputs b(k+φ), b(k+φ−1). The correlator 84 performs the operation of Equation (17) and outputs the correlation value Rm(φ), and the phase-error detector 85 calculates the phase error (amount of phase shift) that has been multiplied by M, namely M·Δθ according to Equation (18) and inputs this to a random walk filter 68.

The random walk filter 68 counts up if the polarity of the phase error is positive and counts down if the polarity of the phase error is negative. If the value of the count exceeds a set value, the filter resets the count to an initial value and reduces the local oscillation frequency by a prescribed amount via the switch 67. If the value falls below the set value, then the random walk filter 68 raises the local oscillation frequency a prescribed amount. In accordance with this AFC control, highly precise, stable synchronization of carrier frequency can be achieved.

Second Embodiment

Figure 20:
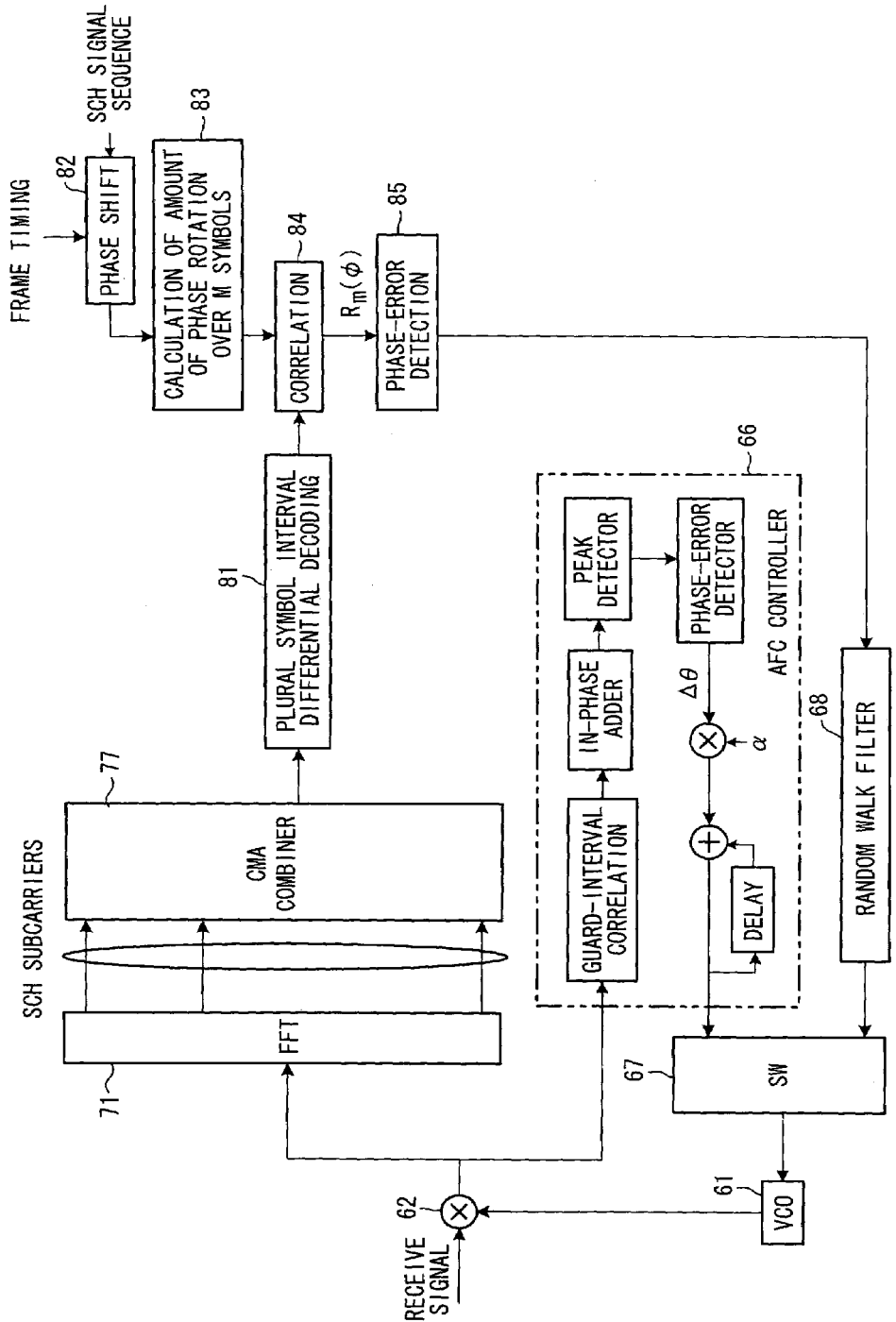
FIG. 20 is a block diagram of a second embodiment of AFC control.

FIG. 20 is a block diagram of a second embodiment of AFC control. This illustrates an arrangement for a case where the combining of subcarrier signals to which SCH has been assigned has been performed in accordance with the CMA algorithm. Control of carrier frequency synchronization in the latter stage is an operation similar to that of FIG. 19.

In a first stage, an AFC unit 66, in a manner similar to that of the example of the prior art (see FIGS. 33 to 35), performs peak detection based upon guard-interval correlation, detects phase error of the correlation value at the peak timing and controls the oscillation frequency of the VCO-implemented local oscillator 61 via the switch 67 so as to reduce the phase error.

Next, SCH frame timing, FFT window timing and the symbol interval M of differential decoding are decided by the control of FIG. 18. The FFT calculation unit 71 thenceforth performs the FFT operation at this FFT window timing, and the CMA combiner 77 outputs the SCH combined signal. The plural-symbol-interval differential decoding unit 81 performs differential decoding over a plurality of symbol intervals according to Equation (16) with respect to the SCH combined signal that is output from the CMA combiner 77.

On the other hand, the phase shifter 82 shifts the phase of the SCH signal sequence b(k) by the amount of the frame timing already found and outputs b(k+φ). The calculation unit 83 for calculating amount of phase rotation over M symbols multiplies M symbol's worth of SCH signal sequences b(k+φ), b(k+φ−1), . . . , b(k+φ−(M−1)) that enter from the phase shifter 82 and outputs the result of multiplication. The correlator 84 performs the operation of Equation (17) and outputs the correlation value $R_m(φ)$, and the phase-error detector 85 calculates the phase error (amount of phase shift) that has been multiplied by M, namely M·Δθ according to Equation (18) and inputs this to the random walk filter 68. The random walk filter 68 exercises control of oscillation frequency similar to that described in FIG. 19 and makes the offset frequency zero. As a result, highly precise, stable synchronization of carrier frequency can be achieved.

(M) Structure of CSSC Discrimination Unit

Figure 21:
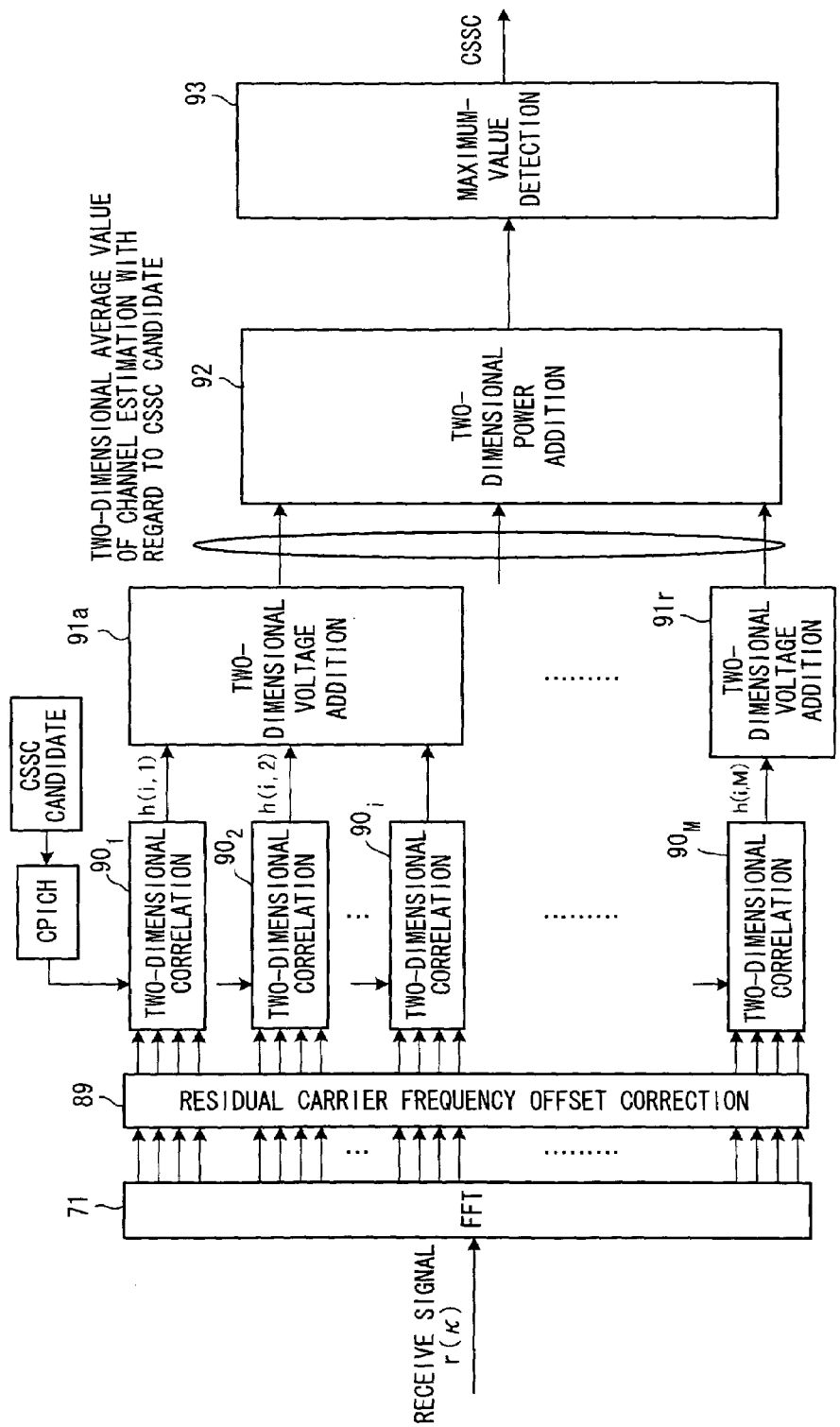
FIG. 21 is a block diagram of an embodiment of a CSSC identifying unit.
Figure 22:
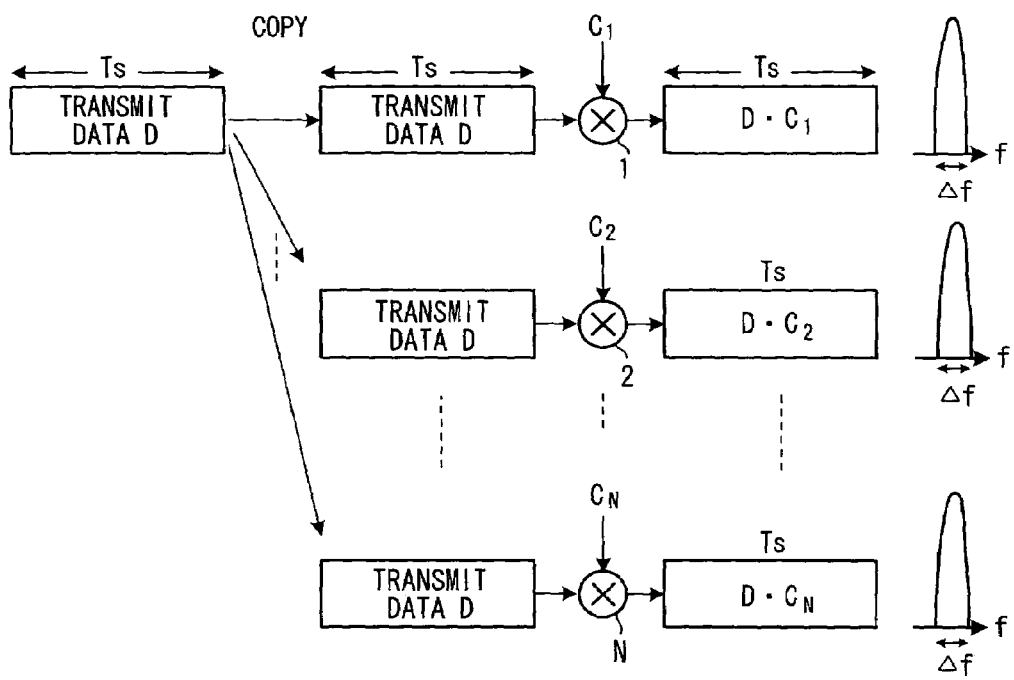
FIG. 22 is a diagram useful in describing the principle of a multicarrier CDMA scheme.
Figure 23:
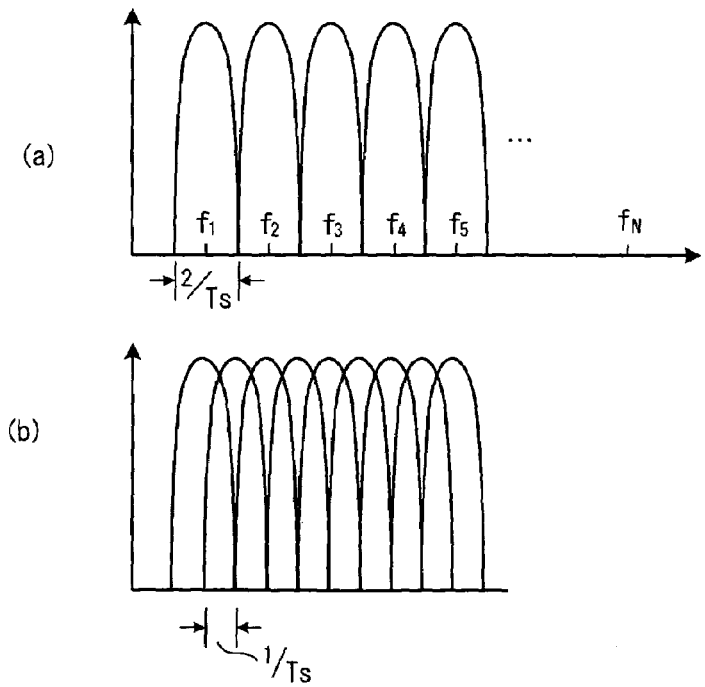
FIG. 23 is a diagram useful in describing placement of subcarriers in multicarrier transmission.
Figure 24:
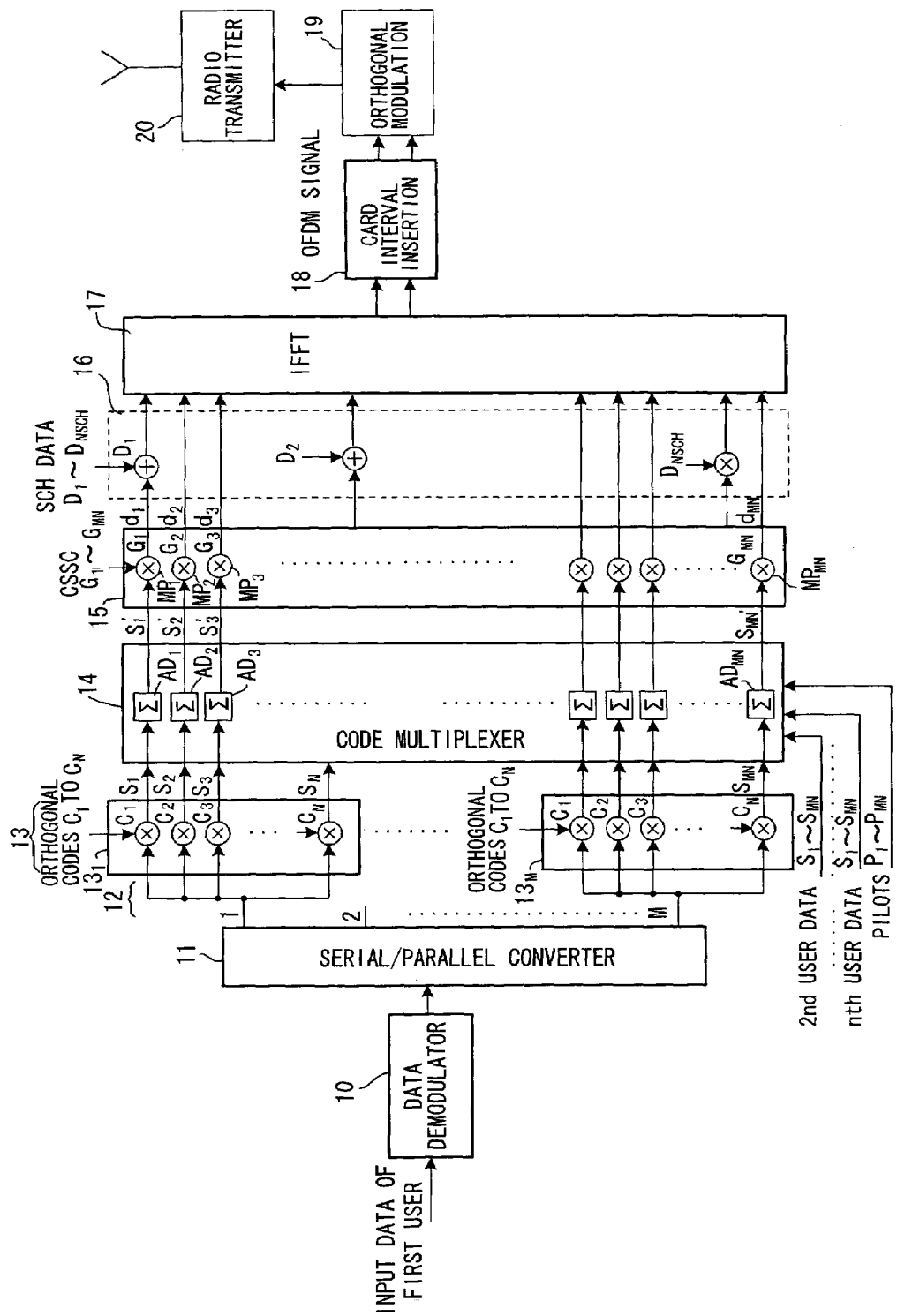
FIG. 24 is a block diagram of a transmitting side (base station) in MC-CDMA.
Figure 25:
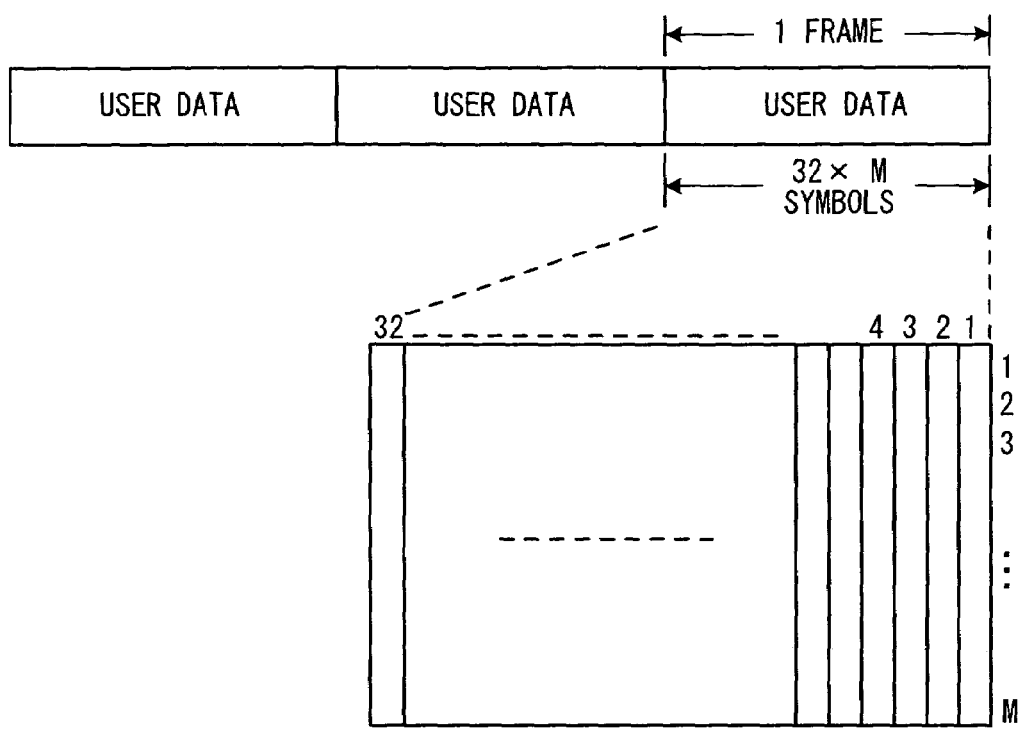
FIG. 25 is a diagram useful in describing user data.
Figure 26:
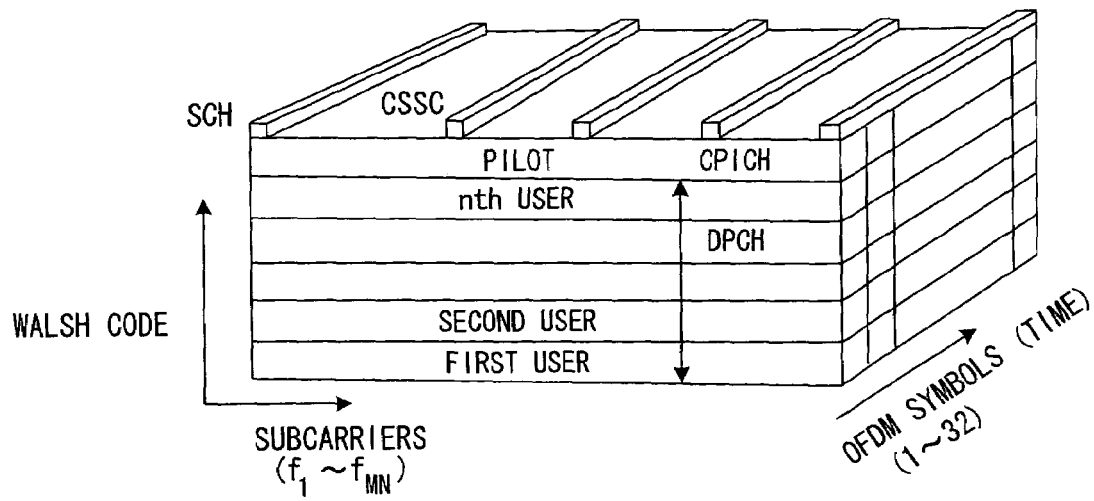
FIG. 26 illustrates a conventional frame structure of a signal transmitted from a base station.
Figure 27:
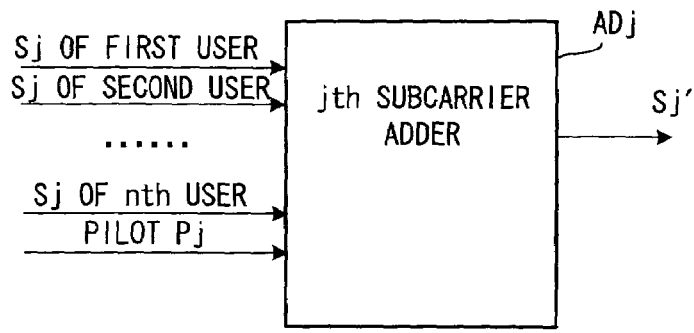
FIG. 27 illustrates a subcarrier adder.
Figure 28:
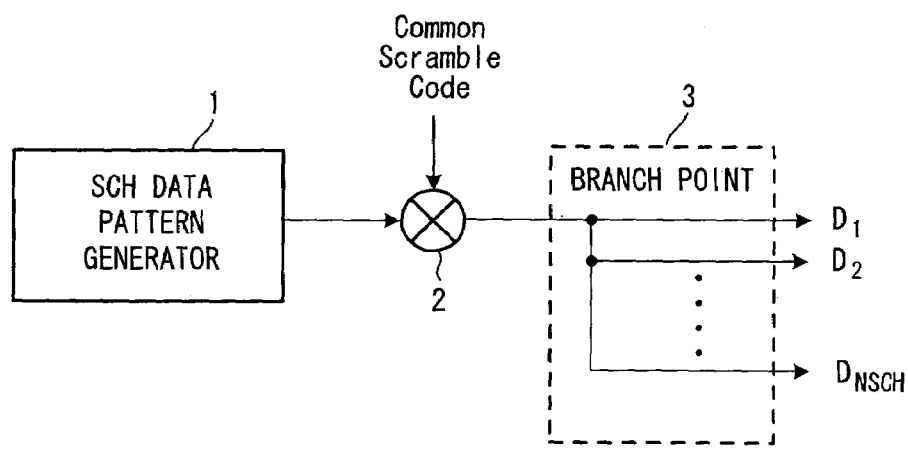
FIG. 28 illustrates the structure of an SCH data generator.
Figure 29:
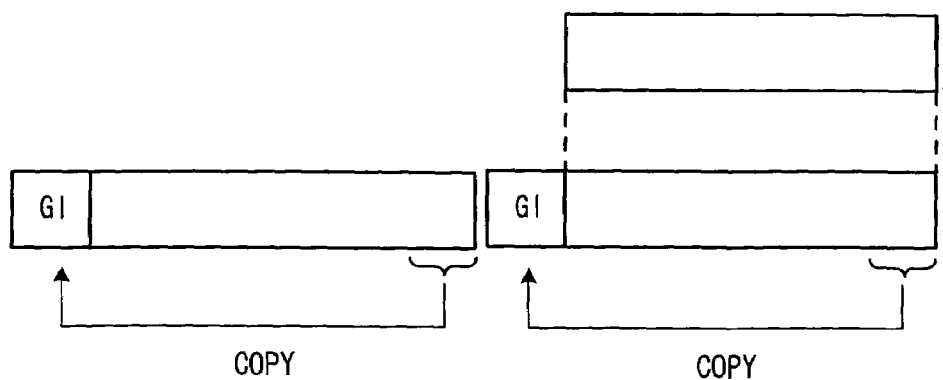
FIG. 29 is a diagram for describing insertion of a guard interval.
Figure 30:
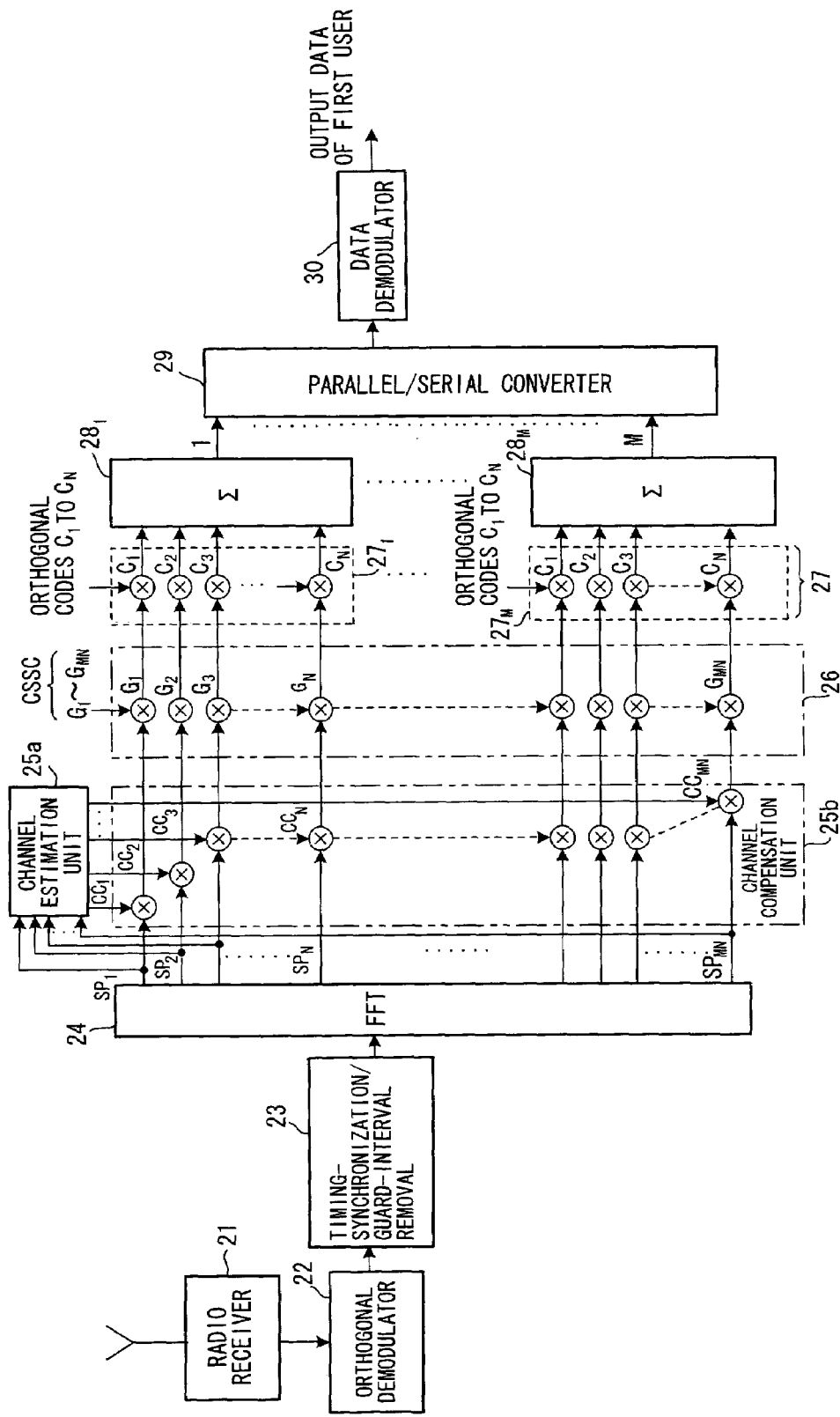
FIG. 30 is a diagram illustrating the structure on the receiving side of a mobile station in MC-CDMA.
Figure 32:
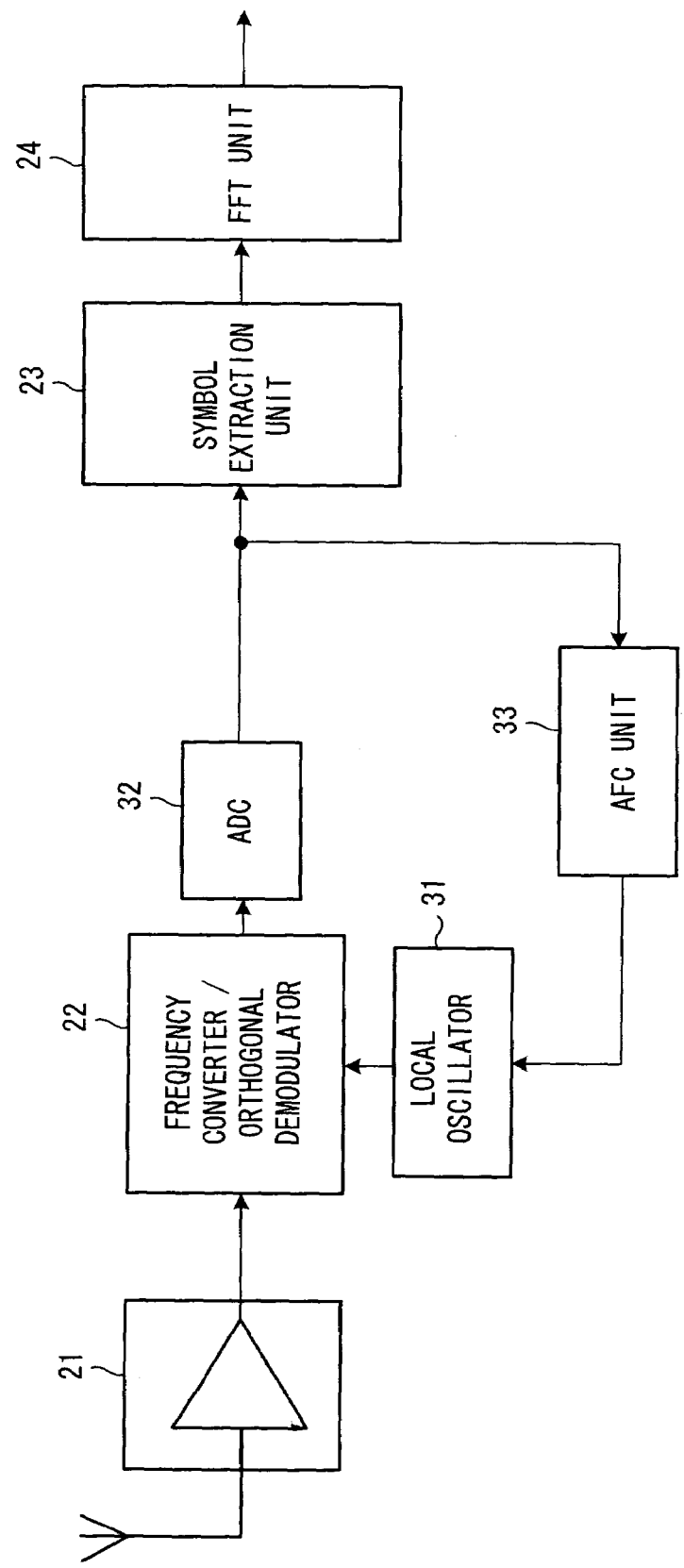
FIG. 32 is a diagram showing the principal part of a receiving apparatus equipped with an AFC unit that causes the oscillation frequency of a local oscillator to agree with the frequency on the transmitting side.

FIG. 21 is a block diagram of an embodiment of a CSSC identifying unit. Components identical with those of FIG. 15 are designated by like reference characters. The two-dimensional correlating calculation units $90_1$ to $90_M$ perform a product-summing operation by multiplying the multiplexed data of CPICH and DPCH, which has been spread to the two-dimensional areas (m×n two-dimensional areas) of frequency and time, by the complex conjugates of pilot (CPICH) and CSSC candidates, and summing the products, and output the product sums (correlation values) as the channel-response estimation values h(i,1) to h(i,M) of CSSC candidates in each of the two-dimensional spreading areas. The arithmetic units $91a$ to $91r$ calculate voltage averages of correlation values within the enlarged two-dimensional area, and the two-dimensional power adder 92 calculates and adds the powers of two-dimensional voltage averages calculated by the arithmetic units $91a$ to $91r$. A maximum-value detector 93 compares the two-dimensional power-addition values of the CSSC candidates and identifies the CSSC candidate for which the power-addition value is maximized as the CSSC of the cell to be connected. The receive data is thenceforth demodulated using the CSSC detected.

The foregoing has been described with regard to a case where the present invention is applied to OFDM-CDMA. However, the present invention can also be applied to a multicarrier modulation scheme, an OFDM (Orthogonal Frequency-Division Multiplexing) scheme or an MC-CDMA (Multi-Carrier Code-Division Multiple Access) scheme.

(N) Effects of the Present Invention

Thus, in accordance with the present invention, exclusive subcarriers are assigned to the synchronization channel SCH. As a result, the synchronization channel SCH is not be acted upon by interference from a dedicated physical channel DPCH or common pilot channel CPICH, and SCH frame timing can be detected accurately. Further, by combining SCH signals of exclusive subcarriers or by performing combining using the CMA algorithm, the SCH combined signal is detected and correlation with respect to a known SCH signal is carried out. As a result, frame timing of SCH can be detected more accurately. Accordingly, SCH frame timing can be detected accurately even in a case where carrier frequency synchronization ascribable to guard-interval correlation is unsatisfactory and residual carrier-frequency error is not negligible.

Further, it is so arranged that an SCH signal sequence is subjected to differential encoding processing. As a result, frame timing can be detected even if phase error ascribable to frequency offset becomes large. Moreover, phase error can be amplified by a factor of M by executing differential decoding processing over M symbols. As a result, discrimination of polarity can be performed correctly even if phase error is small, and oscillation frequency can be controlled highly precisely in such a manner that frequency offset is nulled based upon the polarity of phase error. Further, oscillation frequency can be controlled highly precisely by changing M in accordance with a decrease in $\Delta\theta$ ascribable to AFC control.

Further, in accordance with the present invention, phase error $\Delta\theta$ based upon frequency offset can be amplified by a factor of M and detected accurately by executing differential decoding processing over M symbols. As a result, even if residual carrier frequency offset is present, it is possible to compensate for this residual carrier frequency offset by rotating each subcarrier signal by $\Delta\theta$ in the direction opposite phase error.

Further, in accordance with the present invention, signal sequences of DPCH and CPICH are spread in two-dimensional areas of frequency and time, the spread signals of the two-dimensional areas are multiplied by the complex conjugates of a pilot and cell-identifying scramble codes CSSC and summing is performed to thereby calculate correlation, and channel response of the two-dimensional areas is estimated based upon the correlation value. As a result, the spreading areas and channel estimation areas can be made the same. Consequently, there is no interference from the DPCH, channel estimation precision can be improved and accurate channel compensation becomes possible.

Further, in accordance with the present invention, correlation voltages of a plurality of the two-dimensional areas are added and averaged and a plurality of average correlation voltages are power-added, thereby making it possible to enlarge the difference between a power value with respect to a CSSC of a cell to be connected and a power value with respect to a CSSC of another cell. Further, the fact that cell detection precision can be improved contributes to an improvement in terminal capability. Further, carrier frequency synchronization according to the present invention contributes to an improvement in terminal capability because operation continues even in a data demodulation interval following the end of a cell search.

What is claimed is:

1. A transmitting method for transmitting a transmit signal sequence by a plurality of subcarriers, comprising steps of:
providing a plurality of the subcarriers exclusively for a synchronization channel;
applying differential encoding processing to a signal sequence of the synchronization channel; and
transmitting the differentially-encoded signal sequence of the synchronization channel by said plurality of exclusive subcarriers.

2. A transmitting method for transmitting a transmit signal sequence by a number of subcarriers in a frequency direction, comprising steps of:
spreading transmit signal sequences of a common pilot channel and dedicated channel, which constitute said transmit signal sequence, to two-dimensional areas of time and frequency using channelization codes;
masking said spread signals by scramble codes for cell identification; and
transmitting the masked transmit signal sequence.

3. A transmitting apparatus for transmitting a transmit signal sequence by a plurality of subcarriers, comprising:
a unit for exercising control in such a manner that the transmit signal sequence that includes a signal sequence of a dedicated physical channel is transmitted by a number of the plurality of subcarriers and a signal sequence of a synchronization channel is transmitted by a plurality of the subcarriers exclusively for the synchronization channel; and
a transmitting unit for combining and transmitting subcarrier signal sequences, wherein the transmitting apparatus further comprises a differential encoder for applying differential encoding processing to the signal sequence of said synchronization channel, and said transmitting unit transmits an output signal sequence of the differential encoder by the plurality of subcarriers exclusively for the synchronization channel.

4. A transmitting apparatus for transmitting a transmit signal sequence by a number of subcarriers in a frequency direction, comprising:

a spreader for spreading transmit signal sequences of a common pilot channel and dedicated channel, which constitute said transmit signal sequence, to two-dimensional areas of time and frequency using channelization codes;

a masking unit for masking the spread signals by scramble codes for cell identification; and a transmitting unit for transmitting said masked transmit signal sequence.

5. A frame timing detecting method of a receiving apparatus for receiving a signal that is the result of applying differential encoding processing to a signal sequence of a synchronization channel and transmitting the differentially encoded signal sequence by a plurality of subcarriers exclusively for the synchronization channel, comprising steps of:

executing an algorithm for weighting using weighting coefficients and combining the plurality of subcarrier signals exclusively for said synchronization channel extracted from a receive signal, generating an error signal using said combined signal and updating said weighting coefficients in such a manner that said error signal becomes zero;

applying differential decoding processing to said combined signal;

calculating correlation between a signal sequence obtained by said differential decoding processing and signal sequences obtained by sequentially shifting phase of a synchronization channel signal sequence that prevailed prior to differential encoding; and adopting, as frame timing, a timing at which correlation power is maximized.

6. A frame timing detection according to claim 5, comprising steps of:

finding a phase error from said correlation at the detected frame timing; and correcting oscillation frequency of a local oscillator of the receiving apparatus based upon said phase error.

7. A frame timing detection according to claim 5, comprising steps of:

detecting a first phase error from said correlation at the detected frame timing and finding a ratio M between $\pi/2$ and said first phase error;

executing differential decoding processing by regarding a symbol interval of differential decoding in the differential decoding processing as M;

calculating correlation between a signal sequence after said differential decoding and a signal sequence obtained by rotating phase of a synchronization channel signal sequence, which prevailed prior to differential encoding, over the symbol interval M; and calculating a second phase error of said correlation and correcting oscillation frequency of a local oscillator of the receiving apparatus based upon said second phase error.

8. A frame timing detecting method according to claim 7, further comprising steps of:

increasing the symbol interval M of said differential decoding as said phase error diminishes.

9. A frame timing detecting method according to claim 7, further comprising steps of:

calculating frequency error per symbol block from said second phase error; and rotating phase of each subcarrier signal so as to correct residual frequency error.

10. A frame timing detecting method of a receiving apparatus for receiving a signal that is the result of applying differential encoding processing to a signal sequence of a synchronization channel and transmitting the differentially encoded signal sequence by a plurality of subcarriers exclusively for the synchronization channel, comprising steps of:

applying differential decoding processing to each of a plurality of subcarrier signals exclusively for the synchronization channel extracted from a receive signal and combining the processed signals;

calculating correlation between said combined signal sequence and signal sequences obtained by sequentially shifting phase of a synchronization channel signal sequence that prevailed prior to differential encoding; and adopting, as frame timing, a timing at which correlation power is maximized.

11. A receiving apparatus in a case where a signal sequence of a synchronization channel that has been differentially encoded is transmitted by a plurality of subcarriers exclusively for the synchronization channel and a transmit signal sequence of a dedicated physical channel or the like is transmitted by subcarriers other than said exclusive subcarriers, comprising:

a synchronization channel signal extracting unit for executing an algorithm for weighting using weighting coefficients and combining the plurality of subcarriers signals exclusively for said synchronization channel extracted from a receive signal, generating an error signal using said combined signal and updating said weighting coefficients in such a manner that said error signal becomes zero, and outputting the combined signal as a signal sequence of the synchronization channel;

a differential decoding processing unit for applying differential decoding processing to said combined signal;

a correlation calculating unit for calculating correlation between the signal sequence obtained by said differential decoding processing and a synchronization channel signal sequence that prevailed prior to differential encoding, wherein the correlation is calculated while sequentially shifting phase of the latter signal sequence; and a frame timing detector for detecting, as frame timing, a phase for which correlation power is maximized.

12. A receiving apparatus according to claim 11, further comprising:

a phase error calculation unit for calculating a first phase error $\Delta\theta$ of said correlation at the detected frame timing;

calculation unit for calculating a ratio M between $\pi/2$ and said first phase error $|\Delta\theta|$;

unit for causing said differential decoding processing unit to execute differential decoding processing by regarding a symbol interval of differential decoding in the differential decoding processing as M;

a correlation calculating unit for calculating correlation between a signal sequence after said differential decoding and a signal sequence obtained by rotating phase of a synchronization channel signal sequence, which prevailed prior to differential encoding, over the symbol interval M; and an offset frequency correcting unit for calculating a second phase error of said correlation and correcting oscillation frequency of a local oscillator of the receiving apparatus based upon said phase error.

13. A receiving apparatus according to claim 12, further comprising:

a frequency error calculating unit for calculating frequency error per symbol block from said second phase error; and a phase rotating unit for rotating phase of each subcarrier signal so as to correct residual frequency error based upon said frequency error.

14. A receiving apparatus in a case where a signal sequence of a synchronization channel that has been differentially encoded is transmitted by a plurality of subcarriers exclusively for the synchronization channel and a transmit signal sequence of a dedicated physical channel or the like is transmitted by subcarriers other than said exclusive subcarriers, comprising:

a differential decoding processing unit for applying differential decoding processing to each signal in the plurality of subcarriers exclusively for said synchronization channel extracted from a receive signal;

a combiner for combining output signals of each of the differential decoding units;

a correlation calculating unit for calculating correlation between a combined signal sequence that is output from the combiner and a synchronization channel signal sequence that prevailed prior to differential encoding, wherein the correlation is calculated while sequentially shifting phase of the latter signal sequence; and a frame timing detector for detecting, as frame timing, a phase for which correlation power is maximized.

15. A cell search method of a receiving apparatus for receiving a signal from a transmitter which spreads and multiplexes transmit signal sequences of a common pilot channel and dedicated channel to two-dimensional areas of time and frequency using channelization codes on a transmitting side, masks said multiplexed signal by scramble codes of a base station and transmits said masked signal, comprising steps of:

multiplying each of the subcarrier signals extracted from a receive signal by complex conjugates of the common pilot and scramble code candidates;

adding results of the multiplication in two-dimensional spreading areas and finding channel response;

voltage-adding and averaging channel responses of a plurality of said two-dimensional spreading areas that belong to an enlarged two-dimensional area, and calculating power of the averaged channel response;

power-adding channel responses of each of the enlarged two-dimensional areas; and discriminating, as a scramble code of a base station, a scramble code candidate for which a power-added value is maximized.

16. A cell search method according to claim 15, further comprising steps of:

multiplying each of the subcarrier signals by complex conjugates of the common pilot and base-station scramble code;

adding results of the multiplication in the two-dimensional spreading areas; and estimating channel response and performing channel compensation using said channel-response estimation value.

17. A receiving apparatus for receiving a signal from a transmitter which spreads and multiplexes transmit signal sequences of a common pilot channel and dedicated channel to two-dimensional areas of time and frequency using channelization codes on a transmitting side, masks said multiplexed signal by scramble codes of a base station and transmits said masked signal, comprising:

a channel response calculating unit for multiplying each of the subcarrier signals extracted from a receive signal by complex conjugates of the common pilot and scramble code candidates, adding results of the multiplication in two-dimensional spreading areas and calculating channel response;

a two-dimensional voltage adder for voltage-adding and averaging channel responses of a plurality of said two-dimensional spreading areas that belong to an enlarged two-dimensional area;

a two-dimensional power adder for calculating power of the averaged channel response of said two-dimensional spreading areas and power-adding channel responses of each of the enlarged two-dimensional areas; and a cell discriminator for discriminating, as a scramble code of a base station, a scramble code candidate for which a power-added value is maximized.

18. A transmitting apparatus for transmitting a signal that has undergone Orthogonal Frequency Division Multiplexing, using a plurality of subcarriers, comprising:

a synchronization signal generation unit that supplies synchronization signals used for establishing a frame synchronization, to the input terminals of an IFFT processing unit to which first group of subcarriers for transmitting said synchronization signals are allocated; and a user data generation unit that supplies user data which is code-spread to the input terminals of an IFFT processing unit to which second group of subcarriers for transmitting said user data are allocated, wherein in regard to said first group of subcarriers, signals except said synchronization signals are not code-multiplexed with these synchronization signals, and in regard to said second group of subcarriers, signals which are code-multiplexed are transmitted.

19. A transmitting apparatus according to claim 18, wherein identical signals are transmitted as said synchronization signals in parallel using said first group of subcarriers.

20. A radio communication system, comprising:

a transmitting apparatus for transmitting a signal that has undergone Orthogonal Frequency Division Multiplexing, using a plurality of subcarriers; and a receiving apparatus for receiving the signal transmitted from the transmitting apparatus, wherein said transmitting apparatus includes:

a synchronization signal generation unit that supplies synchronization signals used for establishing a frame synchronization, to the input terminals of an IFFT processing unit to which first group of subcarriers for transmitting said synchronization signals are allocated; and a user data generation unit that supplies user data which is code-spread to the input terminals of an hEFT processing unit to which second group of subcarriers for transmitting said user data are allocated, and said receiving apparatus includes a receive unit that executes frame synchronization processing using the synchronization signals which are received,
wherein in regard to said first group of subcarriers, signals except said synchronization signals are not code-multiplexed with these synchronization signals, and in regard to said second group of subcarriers, signals which are code-multiplexed are transmitted.

* * * * *